United States Patent
Weik, III

(10) Patent No.: US 8,825,535 B2
(45) Date of Patent: *Sep. 2, 2014

(54) MANAGEMENT AND CONTROL SYSTEM FOR A DESIGNATED FUNCTIONAL SPACE HAVING AT LEAST ONE PORTAL

(76) Inventor: Martin Herman Weik, III, Falls Church, VA (US)

(*) Notice: Subject to any disclaimer, the term of this patent is extended or adjusted under 35 U.S.C. 154(b) by 428 days.

This patent is subject to a terminal disclaimer.

(21) Appl. No.: 13/134,698

(22) Filed: Jun. 14, 2011

(65) Prior Publication Data

US 2011/0313893 A1    Dec. 22, 2011

Related U.S. Application Data

(63) Continuation-in-part of application No. 11/228,395, filed on Sep. 19, 2005, now abandoned, which is a continuation of application No. 10/303,025, filed on Nov. 25, 2002, now Pat. No. 6,945,303, which is a continuation-in-part of application No. 10/131,029, filed on Apr. 25, 2002, now Pat. No. 7,146,345, which is a continuation-in-part of application No. 09/644,901, filed on Aug. 24, 2000, now Pat. No. 6,484,784.

(51) Int. Cl.
G06Q 10/00    (2012.01)
G06Q 20/00    (2012.01)

(52) U.S. Cl.
USPC ............................................. 705/28; 705/22

(58) Field of Classification Search
None
See application file for complete search history.

(56) References Cited

U.S. PATENT DOCUMENTS

| | | |
|---|---|---|
| 1,617,440 A | 2/1927 | Duncanson |
| 3,604,898 A | 9/1971 | Magnusson |
| 3,989,932 A | 11/1976 | Koerner |
| 4,147,197 A | 4/1979 | Bailey et al. |
| 4,785,293 A | 11/1988 | Shearer et al. |

(Continued)

FOREIGN PATENT DOCUMENTS

| | | |
|---|---|---|
| DE | 37 15 314 A1 | 11/1998 |
| DE | 298 23 240 U1 | 6/1999 |

OTHER PUBLICATIONS

Bajic et al., "Auto-ID mobile information system for vehicle life cycle data management", Systems, Man and Cybernetics, 2002 IEEE International Conference on; Date of Conference: Oct. 6-9, 2002 vol. 4.

*Primary Examiner* — Mussa A Shaawat
(74) *Attorney, Agent, or Firm* — Michael J. Foycik, Jr.

(57) ABSTRACT

A control and management system for defined areas such as loading docks, fire stations, and other designated defined areas, employs a card reader, vehicle sensing loop detectors and electric eyes, entrance door sensors and operators, truck securement devices, cameras, a control system with memory, and a wireless connection or internet/intranet connection, is provided to produce event log documentation. The event information is readily accessible by management or supervisory personnel, to see all of the recorded information concerning a specified event. Thus, an event can be readily reconstructed after the fact, using all available sensors and other information relevant to a manager or supervisor. This aids in locating lost packages, documents security procedures, preventing or detecting thefts and vandalism, and for other purposes. An alert can be issued whenever an abnormal or unauthorized event occurs during operations. A QR code reader can be provided for a cell phone with picture-taking capability, which communicates with the system to enable a person carrying the cell phone to scan QR codes at specified locations or on specified items or vehicles.

15 Claims, 20 Drawing Sheets

(56) References Cited

U.S. PATENT DOCUMENTS

| | | | |
|---|---|---|---|
| 4,794,973 A | 1/1989 | Perisic | |
| 4,848,522 A | 7/1989 | Wolf | |
| 4,953,608 A | 9/1990 | Larsson | |
| 5,022,452 A | 6/1991 | Burrell | |
| 5,034,739 A | 7/1991 | Gruhl | |
| 5,070,442 A | 12/1991 | Syron-Townson et al. | |
| 5,228,492 A | 7/1993 | Jou | |
| 5,243,735 A | 9/1993 | Obrien, III | |
| 5,245,879 A | 9/1993 | McKeon | |
| 5,270,629 A | 12/1993 | Hsieh | |
| 5,323,151 A | 6/1994 | Parsadayan | |
| 5,332,021 A | 7/1994 | Todd et al. | |
| 5,355,927 A | 10/1994 | McKeon | |
| 5,386,891 A | 2/1995 | Shea | |
| 5,414,624 A | 5/1995 | Anthonyson | |
| 5,540,269 A | 7/1996 | Plumer | |
| 5,542,460 A | 8/1996 | McKeon | |
| 5,557,887 A | 9/1996 | Fellows et al. | |
| 5,576,581 A | 11/1996 | Iannuzzi et al. | |
| 5,577,541 A | 11/1996 | McKeon | |
| 5,605,185 A | 2/1997 | McKeon | |
| 5,634,507 A | 6/1997 | Kwoka | |
| 5,673,514 A | 10/1997 | McKeon | |
| 5,706,875 A | 1/1998 | Simon | |
| 5,729,101 A | 3/1998 | Richmond et al. | |
| 5,740,050 A * | 4/1998 | Ward, II | 705/418 |
| 5,743,320 A | 4/1998 | McKeon | |
| 5,828,302 A | 10/1998 | Tsutsumi et al. | |
| 5,832,665 A | 11/1998 | Miller et al. | |
| 5,893,234 A | 4/1999 | McKeon | |
| 5,956,081 A * | 9/1999 | Katz et al. | 348/163 |
| 6,079,162 A | 6/2000 | Hein | |
| 6,082,433 A | 7/2000 | Vafaie et al. | |
| 6,229,455 B1 * | 5/2001 | Yost et al. | 340/943 |
| 6,323,761 B1 * | 11/2001 | Son | 340/426.35 |
| 6,329,930 B1 | 12/2001 | Parsadayan | |
| 6,388,559 B1 | 5/2002 | Cohen | |
| 6,522,352 B1 * | 2/2003 | Strandwitz et al. | 348/211.2 |
| 6,715,586 B1 | 4/2004 | Shubin | |
| 6,945,303 B2 | 9/2005 | Weik, III | |
| 7,065,140 B1 * | 6/2006 | Ritter et al. | 375/240.25 |
| 7,104,447 B1 * | 9/2006 | Lopez et al. | 235/384 |
| 7,113,090 B1 | 9/2006 | Saylor et al. | |
| 7,138,912 B2 | 11/2006 | Fitzgibbon et al. | |
| 2003/0014316 A1 | 1/2003 | Pratt et al. | |
| 2003/0081747 A1 | 5/2003 | Ahlstrom et al. | |
| 2003/0084328 A1 | 5/2003 | Tarquini et al. | |
| 2003/0112335 A1 * | 6/2003 | Strandwitz et al. | 348/211.2 |
| 2003/0193393 A1 | 10/2003 | Ford | |
| 2003/0197188 A1 | 10/2003 | Watatani et al. | |
| 2004/0172283 A1 | 9/2004 | Vanderveen et al. | |
| 2005/0138111 A1 | 6/2005 | Aton et al. | |
| 2008/0271109 A1 | 10/2008 | Singh et al. | |
| 2009/0216876 A1 | 8/2009 | Hsieh et al. | |
| 2010/0201482 A1 | 8/2010 | Robertson et al. | |
| 2010/0289661 A1 | 11/2010 | Styers et al. | |
| 2010/0328104 A1 | 12/2010 | Groft | |
| 2011/0084840 A1 | 4/2011 | Mercier et al. | |
| 2011/0084855 A1 | 4/2011 | Simon | |
| 2011/0260851 A1 | 10/2011 | Richman | |
| 2012/0062395 A1 | 3/2012 | Sonnabend et al. | |

* cited by examiner

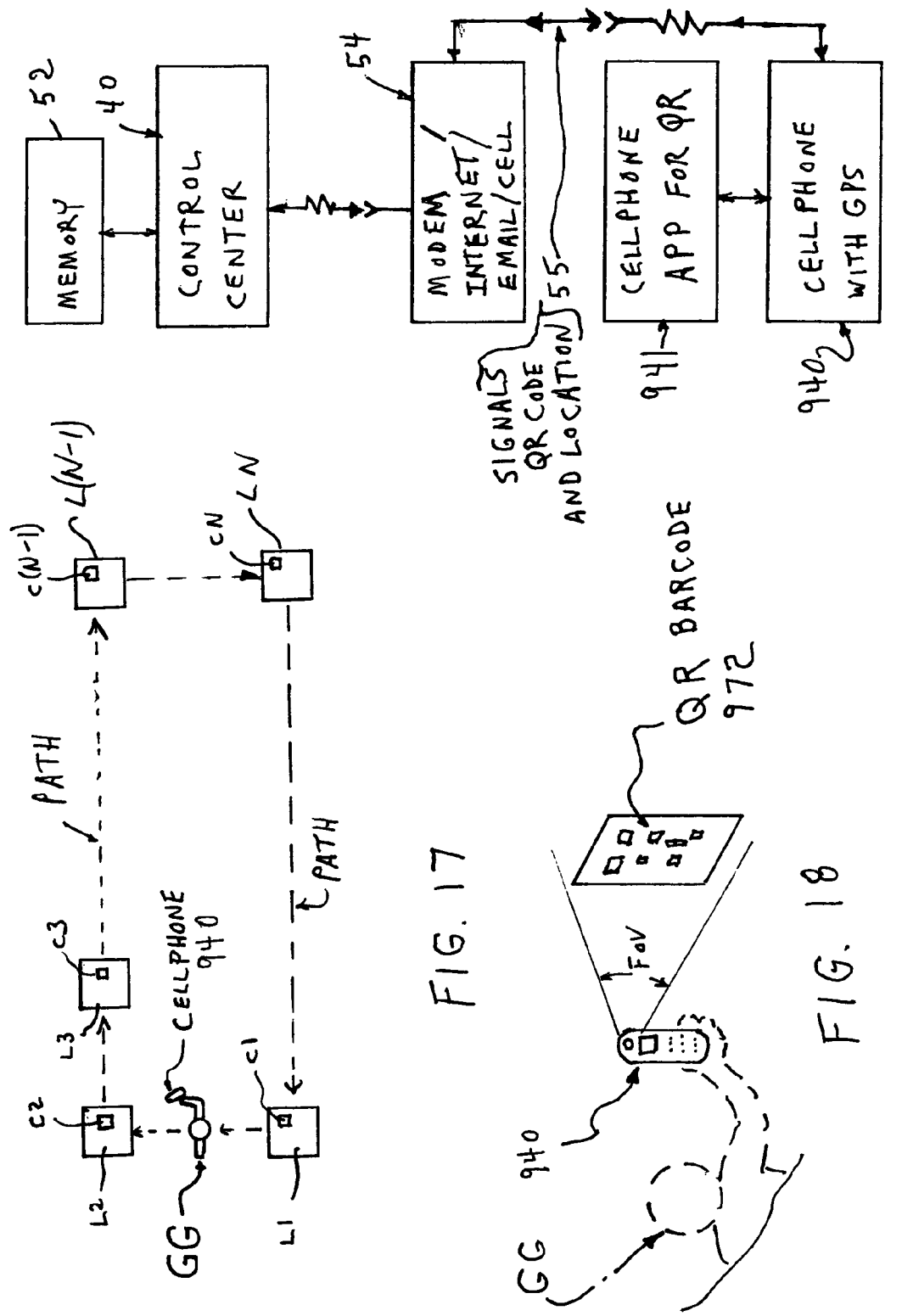

MANAGEMENT AND CONTROL SYSTEM FOR A DESIGNATED FUNCTIONAL SPACE HAVING AT LEAST ONE PORTAL

This application is a continuation-in-part of, and claims the priority of U.S. patent application Ser. No. 11/228,395 filed on Sep. 19, 2005, now abandoned by inventor Martin Herman Weik, III, entitled "Intruder, theft and vandalism deterrent management system for controlling a parking area," now pending, and which in turn is a Continuation of Applicant's prior U.S. application Ser. No. 10/303,025, filed on Nov. 25, 2002 and now U.S. Pat. No. 6,945,303, which is a continuation-in-part of Applicant's prior U.S. patent application Ser. No. 10/131,029, filed Apr. 25, 2002 now U.S. Pat. No. 7,146,345, and which is a continuation-in-part of U.S. patent application Ser. No. 09/644,901, filed on Aug. 24, 2000, now U.S. Pat. No. 6,484,784 issued on Nov. 26, 2002. This application also claims the priority of U.S. patent application Ser. No. 11/384,411 by inventor Martin Herman Weik, III, entitled "Parking barrier with accident event logging and self-diagnostic control system," now U.S. Pat. No. 7,509,991. This application also claims priority of U.S. Ser. No. 12/930,437 filed on Jan. 6, 2011 and expressly incorporated herein by reference thereto. The contents of each of the above-identified parent applications are hereby expressly incorporated herein by reference.

FIELD OF THE INVENTION

The present invention relates to a management and control system for a designated functional space having at least one portal. Such designated spaces can include, for example, shipping and loading docks, fire stations, homes, offices, and parking areas.

BACKGROUND OF THE INVENTION

A door, opening, or portal between defined areas address the human need to satisfy different human concerns. For instance, the human concerns that are satisfied in a designated area called a bathroom are different than the concerns satisfied by an area defined by the term "kitchen", "bedroom," etc. The commonality of concerns that are satisfied in a particular designated space create common designations such as loading dock, fire station, garage entrance or garage exit, etc. Each designated space and its possibility of satisfaction of the concerns it is designed to address has within its possibilities inherent transparent functionality and the possibility for breakdown and malfunction where operational transparency breaks down.

To a great degree the transparent functionality of a designated space as well as the breakdown of the transparency is predictable. Because both transparency and breakdown are predictable to masterful practitioners who utilize the space, tools can be created to help manage the inevitable predictable outcomes. Furthermore, often there are multiple practitioners who utilize a space. The tools can then be designed to satisfy the concerns of different groups of practitioners. The art of successful integration then, is developing tools that satisfy concerns across a wide network of practitioners who operate in a defined space.

In previous applications and issued patents by this inventor, there has been examined a building's garage portal as an example of an opportunity to address multiple concerns for a designated space.

A specific area of interest is, for example, the shipping industry. Here there are a myriad of participants, each with their individual and sometimes overlapping concerns. Security officers deal with theft, service technicians deal with dock equipment malfunctions, shipping schedulers manage the details of shipping and deal with the logistics of moving packages and items, the public including those ordering goods wish to know where their shipment is, and dock personnel load, unload and sometimes lose or even damage goods they are handling. Systems such as bar code or RFID technology have evolved to track shipments, GPS to track the trucks, and access cards and secure locked and gated areas have evolved to address particular concerns of the participants noted above.

That is, individual and piecemeal solutions have been provided to deal with the individual concerns of the individuals mentioned above. Once any malfunction, error, mishap, theft, vandalism, crime, or other unusual event occurs, it is not possible to successfully reconstruct the available information in a readily useful and readily available form as the information is often located on different platforms that have evolved to address the different domains of concern.

The problem with the individual approach to solutions is that it lacks the coherency and advantages that might be available in well-conceived inventive integrated solutions. For instances of such piecemeal solutions, as a first example, the safety eye on the dock bay door that is designed to address door safety issues is not integrated into the camera system. A video recorder might take pictures based on motion or may constantly be generating mountains of useless data that has to be examined at length if a breakdown is identified.

In a second example, a shipment security officer is interested in the integrity of the shipments. Typically, the shipping terminal puts a device called a security seal that cannot be removed without its destruction, and which is installed on the truck doors in addition to a removable lock. However, there is no associated data when such security seal is broken, and thus the value of the security seal is limited. The safety eye on the dock door does not activate the cameras and there is no touch pad screen on a portal manager on which to enter the employee ID and security tag number that can track the event of opening the cargo door.

Turning attention to the fire station industry, here there can be a myriad of participants, each with their individual and sometimes overlapping concerns. Security officers deal with equipment theft and station security, service technicians deal with door and fire equipment malfunction, dispatch schedulers deal with the assigning equipment to various alarms; the public may show up at stations randomly, and fire station personnel must be trained, managed and their presence recorded for payroll and assignment functions. Thieves and rogue employees might steal from unattended firehouses when personnel are responding to alarms and emergencies. Various piecemeal solutions to such concerns include systems such GPS to track the trucks, access cards issued to fire personal to record or control access, doors which may be transmitter controlled, and secure areas within the station can be locked and/or gated. Video recorders and security alarm systems may be installed to record ongoing activities. However, this information is not accessible by event, and is not readily available for checking by managers or supervisors in a manner that gathers all available data into a conveniently accessible form.

As a third example of a need in the prior art, the safety eye on the station bay door that is designed to address door safety issues is not integrated into the camera system or intruder detection system. A video recorder might take pictures based on motion or is constantly generating mountains of useless data that has to be looked at if an intrusion event is identified.

Other information is similarly useless, and is often unrecorded and unavailable after the fact.

As a fourth example of a need in the prior art, an outside safety loop that holds a portal door open against its timeout is not integrated into a system where the system can notify an administrator that a vehicle is blocking the exit door to the fire station, parking garage, etc. or that someone is loitering outside a portal as detected by a motion/presence detector and a message is not currently sent to a guard or security officer and in high security cases actually block the portal door from opening. There is in the prior art no way to define high, medium or low security run profiles that defines different operational formats under different security threat levels or time periods.

As a fifth example of a need in the prior art, a camera that is constantly recording will not allow individual frames to be associated with specific events. Station bay doors typically can open on individual ceiling pull command, by push button station either at the door or at the station manager desk and or on "alarm." The doors will then often close on timer command after the fire vehicle has exited. Not uncommon is the circumstance where the safety eye is blocked, safety loop malfunctions or other event occurs where the door fails to close which leaves the station open and vulnerable to theft and vandalism. There exists a need to set an alert parameter to email, text message, or otherwise alert a fire station or security officer that a door has failed to close so specific action can be taken to address the problem.

As a sixth example of a need in the prior art, in existing rental car facility arrangements, rental cars exit the rental lot by a typical system having a barrier gate (e.g., a gate arm, "tiger teeth" plate barrier, or similar devices or combination) which is opened by an employee checking the contract and documents at the gate, or by a ticket issued at the counter which allows a single use within a determined time window through an un-manned gate. Also typically seen in such existing rental car facilities are CCTV cameras at various locations around the exit which record 24/7 to a VCR or hard-drive based recording system, with no correlation between the "event" (car exiting) and the recording. Current systems to monitor vehicle condition is handwritten notes on the contract or a small paper card on which the agent or renter marks the approximate location of any damage.

Any missed damage at checkout leads to either trying prove when damage occurred, dealing with customers trying to pass off damage caused while car was in their possession as "not their fault", or, in the absence of any proof, paying for the repair out of profits.

Another problem is outright theft of vehicles. Boards can be placed over tiger teeth and driven over, exit personnel (sometimes third-party hired guards) might be "in on it" and open the gate, or leave their post at a certain time. Equipment breakdowns that have not been noticed yet leave gaps in the security envelope around the lot.

The gate equipment is subject to tremendous stress due to the high volume of vehicles exiting through an exit typically consisting of one to three lanes. Many locations clear hundreds of rental cars per day. In addition, shuttle buses, car carriers, tow trucks, and delivery trucks require special consideration regarding the exiting sequence to prevent damage to the equipment or vehicle.

SUMMARY OF THE INVENTION

From the foregoing, it is seen that it is a problem in the art to provide a device meeting the above requirements. According to the present invention, a device and process are provided which meets the aforementioned requirements and needs in the prior art.

As noted above, the individual and piecemeal solutions previously provided to deal with the unique concerns of the individuals mentioned above, are useful separately. But, these uses are merely piecemeal and do not make use of all of the available information in a form that is both convenient and useful to a manager or supervisor trying to reconstruct an event after the fact. Nor do they cross connect, which taken together allow for the sum to be greater than the parts. Once any malfunction, error, mishap, theft, vandalism, crime, or other unusual event occurs, the prior art devices and systems do not make it possible to successfully reconstruct the available information in a readily useful and readily available form.

By the present invention, a system and devices are shown which enable use of the information surrounding any of the identified events. Examples of such events are as noted above, and many more such events can be identified by users. The system of the present invention is flexible and adaptable to accommodate these needs.

For example, if a theft occurs or there is a lost package, it would be useful for a manager or supervisor to be able to check each event (examples include unloading, opening of a door or portal, a malfunction report, or a timeout event, among many other possible types of events) to see all of the available information surrounding that specific event. Such available information is that provided by the sensors (presence sensors for vehicles, gate and door sensors showing positions thereof), as well as frames of video for that specific event). Thus, an unloaded package and the dock personnel handling that package will be visible in video frames at the "unloading" event, and may also be visible during "intruder" events, "malfunction" events, "scanning" events where bar codes of packages are scanned, etc.

Referring to the first example mentioned in the Background of the Invention relating to piecemeal solutions used in the prior art, by the present invention a camera system is advantageously provided and used, and integrated into a system, such that it is controlled by the dock door being "not closed" and "safety eye activated" or perhaps scanned so that it would generate data only when activities relating to loading or unloading into a particular vehicle are actually occurring.

Referring to the second example mentioned in the Background of the Invention relating to piecemeal solutions used in the prior art, by the present invention a camera system is advantageously provided and used, and integrated into a system, such that it is controlled by or activated by any of the various devices that control the portal equipment. For instance: Since the shipping seal is located on the truck rear door and the truck is backed up to the dock, anyone cutting the seal would be by necessity also be breaking the door safety eye beam. A camera that was triggered by the safety eye would then capture the seal cutting event.

Thus, various other data is associated by the present inventive system relating to this event, such as vehicle sensor data, shipping door position, other doors' positions, and video frame data, etc. These items of information are all stored in such a way that they can be associated with specific events, and reports can be generated and the data can be reviewed by a manager or supervisor for such events. Thus, there is associated data when such security seal is broken, and thus the value of the security seal is greatly enhanced.

Referring to the third example mentioned in the Background of the Invention relating to piecemeal solutions used in the prior art for fire stations, by the present invention a camera system is advantageously provided and used, and integrated into a system, such that it is controlled by or activated during events such as the station door being "not closed" and "safety eye activated" and would generate data only when an intrusion event is actually occurring. This information is provided by the present invention as information related to the specific event in question.

In addition, the present invention provides a system that immediately e-mails and/or text messages a concerned participant such as the station manager or supervisory personnel, when specified types of events occur or fail to occur within a defined time window, or in a proper sequence.

Referring to the fourth example noted hereinabove of a need in the prior art, a safety loop that holds the bay door open against its timeout can by the present invention be integrated into a vehicle presence detector, and optionally can also use RFID technology that would be able to determine that a piece of equipment is "home" and ready for dispatch; and all this information is associated with individual recorded events.

Referring to the fifth example of a need in the prior art, a camera that is constantly recording will by the present invention allow individual frames to be associated with specific events. If integrated into the door controller, the camera would capture door vehicle impacts as noted in one or more of this inventor's previous patent applications and patents identified hereinabove, and can also work to detect intruders in combination with the safety eye activation. The same camera integrated into the station operation platform according to the present invention would also enable remote verification that a piece of equipment is "home" and ready for use, would capture intruder events, and allow remote operation of door equipment on camera which would allow safe overriding of safety controls as is specified in UL specifications. Further, station bay doors typically can open on individual ceiling pull command, by push button station either at the door or at the station manager desk and or on "alarm" and by the present invention these events are recorded and associated with other available information for retrieval later in a convenient and readily accessible form. Likewise, the doors will then often close on timer command after the fire vehicle has exited, and not uncommon is the circumstance where the safety eye is blocked, safety loop malfunctions or other event occurs where the door fails to close which leaves the station open and venerable to theft and vandalism. In the present invention all of this information is available readily and conveniently associated together by recorded events.

An example of an apparatus and system related to the foregoing and which can be used in the present invention is a commercial embodiment which is known as SmartDoor System model SDS-0400™, iPortal™ Manager, and which in combination with the teachings of the present invention addresses the concerns of parking managers, parking attendants, overhead door service technicians, emergency fire and rescue, parking patrons, building engineers, building owners, building managers and security officers. Each activity that occurs in the portal area is broken down into its individual components and then parsed into a data base where it can be reconstructed in report form so as to address the individual concerns of the designated area practitioners noted above. The above-noted iPortal™ Manager also is designed to switch into different operational formats in direct response to commands or circumstances as sensed by its network of sensors and its program. In the event of multiple signals or commands for simultaneous different run characteristics, the system responds based on a hierarchy determined by its program. This is standard "state machine" technology that is well understood by developers and programmers dealing in the art of motion control.

Referring to the sixth example of a need in the prior art, the controlled exit system for a rental car facility according to the present invention solves the aforementioned breakdowns in existing systems by adding accountability, data logging, equipment monitoring, and communication to a system that typically lacks all of these.

The controlled exit system envisioned by the present invention comprises: one or more high resolution cameras (IP or similar), the iPortal™ Manager, the gate/barrier system, and the sensors and control inherent to the gate/barrier system and a broadband connection to the internet and system server.

The present invention allows for car rental businesses to shift more vehicle damage costs to renters using the timestamped, search-able data logs with high resolution attached images to more accurately assess the condition of the car as it exited, which can then be compared to the returned condition. A hand-held tablet computer with WiFi connection to the custom server software can instantly bring up high resolution video of car leaving the lot, making it easy to see what condition the car was in as it left the lot. This would eliminate the renter from arguing about when the damage occurred. A second set of cameras installed at the entrance to the lot would record the condition as the car was returned, eliminating human error or inattention from the process. This benefits the customer's peace of mind regarding scratch and dent scams. The rental company benefits from have verifiable proof of any damages done to the car.

The system also monitors, controls, and notifies appropriate personnel of any breakdowns, failures, or tampering of the barrier and sensor system, in real-time via electronic communication, text message, email, SMS, or through a sounder, light or buzzer controlled by the SDS-0400IP™ panel. Logs of sensor activations, along with the photo records, simplifies troubleshooting of problem, including intermittent failures normally requiring multiple costly service calls to repair technicians. Such diagnostics can help onsite personnel repair simple problem themselves, reducing security-compromising downtime.

Through signal monitoring and analysis, the iPortal™ Manager panel detects and notifies if more than one vehicle exits during a let-out, eliminating vehicles from being "waved through" or otherwise leave the lot without proper verification. Each vehicle that is sensed that exits without proper verification is logged and data captured and the iPortal Manager™ instantly notifies the manager, security, and/or other appropriate personnel. Eyewitness reports are notoriously unreliable, existing CCTV systems are unwieldy and slow to use, typically have very poor image quality, thus increasing the time to gather license plate number, vehicle description, and driver descriptions to give to law enforcement in order to recover the vehicle. In these situations time is a critical factor, and with the iPortal™ Manager on duty and with the management system of the present invention an operations or security manager can have high quality pictures of the car and driver in his email in-box long before reports of the theft gathered from daily inventory logs can make it to him/her from the other personnel. This added, high quality, timely information should prove invaluable to the speedy recovery and prosecution of thefts.

This system also allows for verified, timestamped, photographed, contract linked unmanned let-out, reducing staffing needs and cost, especially during off hours. Entering a contract number into the device initiates a let out procedure which can be either fully automated, or verified and egress granted by an agent located at the rental counter or office.
Implementation of the Rental Car Facility Management System of the Present Invention:

Upon entering the gate exit area, a loop, motion, or other vehicle sensor signals to the iPortal™ Manger device that a car is present. The Manager communicates through LAN, serial or direct control to the camera or cameras to begin capturing images at a predetermined frame rate or create a video clip. This can continue until the sensor indicates that the car is no longer present, or alternatively can continue for a predetermined period of time.

Manned Locations:

A car rental agent would enter contract number into the iPortal Management System device via touchscreen display or other terminal, reader, barcode scanner or other connected input device connected to the iPortal™ Manager server or data storage device through the LAN or internet. This then ties the let out event to the rental contract, and to the set of pictures, timestamped and available for review.

The car rental agent then selects the type of let-out from a list: rental, delivery, contractor, vehicle maintenance, personal car, airport bus, etc. This creates a search-able log of all exit events, search-able by time, type, contract number. Any different types of letouts can be defined and tracked by the system. An RFID or other uniquely identifiable readable device on the bus would open the gate and also be tracked into the system.

After data is entered, the iPortal™ Manager device opens the barrier system, continuing to record until the vehicle has cleared the gate and the gate has returned to the secure position.

Through the complete monitoring of sensor signals, the iPortal™ Manager device can determine if more than one vehicle has exited, triggering notification. Equipment breakdowns or signal anomalies are detected and notifications immediately sent, reducing damages to vehicles and equipment such as tire shredding by poorly performing tiger teeth.

Through automatic signal analysis, the iPortal™ Manager can detect multiple types of faults, notify as needed, and disable equipment until repaired.

Manual control is possible in some fault conditions to allow equipment to be run with sensor faults. This is not the case with current control designs.

Un-Manned Exit:

A renter enters a contract number on a touchscreen of the iPortal™ Manager device or uses another connected input device. An agent at a second terminal remotely located verifies the contract number and initiates let-out as in manned exit, and can view high resolution video feed as the renter exits to verify the process.

Non-renters can be let out by same process, by entering for instance a "0" to initiate the process Alternative Entry/Exit Method:

Permission to exit is granted at a rental office counter by a terminal that will generate a code using the let-out algorithm. This code can be set to be valid for a set amount of time and good for a single use. The code can be linked to the contract number, allowing for the same search-able, verified data as described above.

An entry lane or lanes preferably includes a terminal, touchscreen, card reader, bar-code scanner or similar data entry device, at least two cameras mounted such that as the car drives through, all sides are recorded, and a vehicle presence device. The renter would enter or scan an identifying contract number, a frequent renter card, or other unique identifier as was used to exit the facility originally. The server software would link the entering and exiting photo records together, timestamped, and linked to the renter.

Other objects and advantages of the present invention will be more readily apparent from the following detailed description when read in conjunction with the accompanying drawings.

BRIEF DESCRIPTION OF THE DRAWINGS

FIG. 17 is a schematic diagram of a plurality of locations visited by a guard using a cell phone camera for verification.

FIG. 18 is a schematic diagram of a QR barcode being scanned by a cell phone used by a guard as in FIG. 17, for scanning the barcode.

FIG. 19 is a block diagram showing how the cell phone of FIGS. 17 and 18 interacts with the control center and modem of FIG. 4, to send signals indicating the QR code and location.

DETAILED DESCRIPTION OF THE INVENTION

Figure 1:
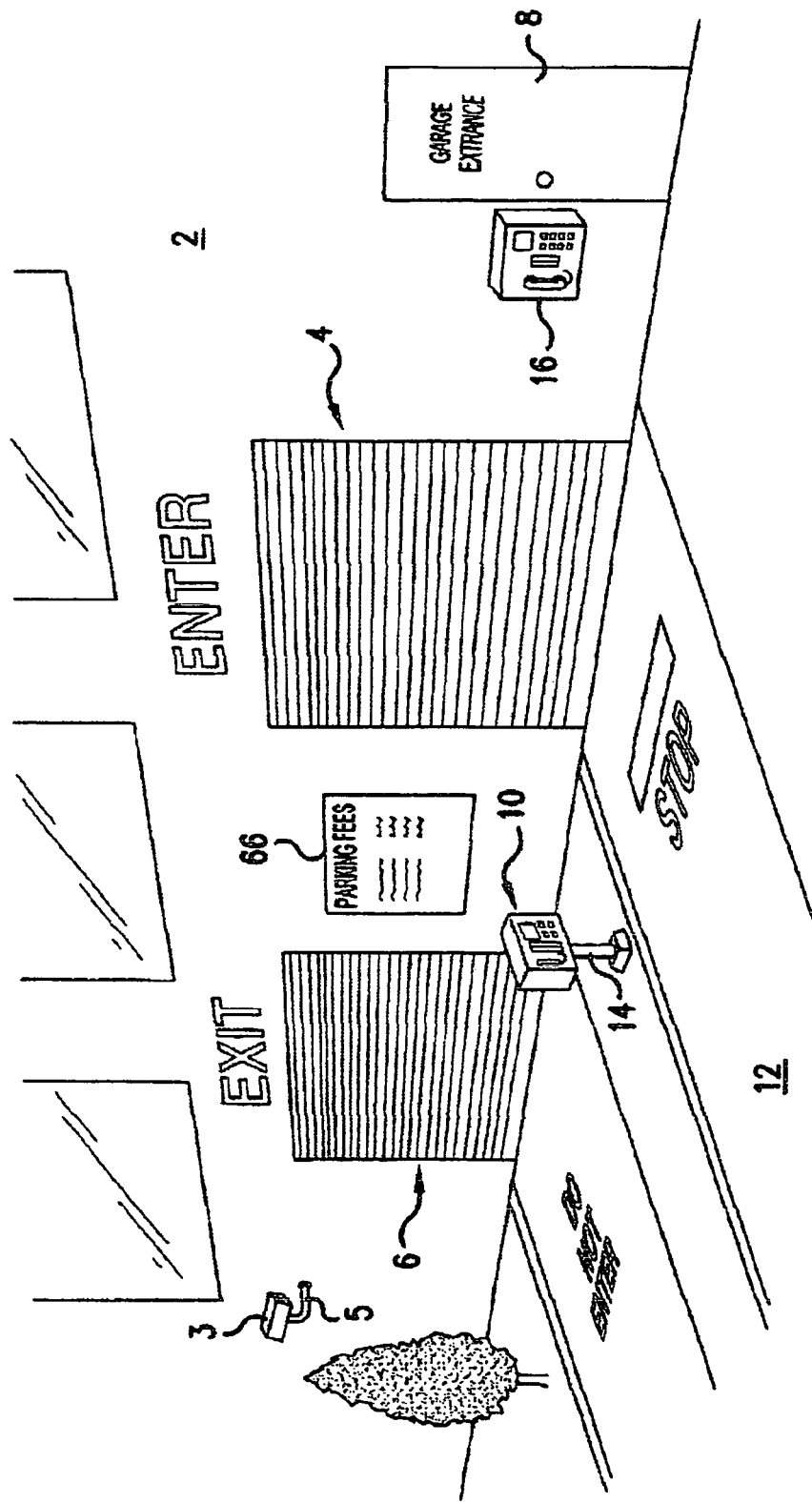
FIG. 1 is an outside perspective view of a parking garage entrance and exit area for vehicles and foot traffic.

FIG. 1 is a perspective view of a building 2 having an underground parking garage viewed from a street outside of the building 2. The building 2 includes a vehicle entrance 4 and a vehicle exit 6. The building 2 also includes an access door 8 for entering and exiting the parking garage by foot. A first customer terminal 10 is located alongside an entrance ramp 12. The first customer terminal 10 is mounted on a post 14, which is situated on a driver's side of the entrance ramp 12. A similar, second customer terminal 16 is provided on an exterior wall of the building 2 adjacent to the door 8. The customer terminals 10, 16 will be described in greater detail with reference to FIG. 3.

A first camera 3 is provided on a post 5 attached to the building 2. The first camera 3 has a view of the outside portions of the vehicle entrance 4, the vehicle exit 6 and the access door 8. The first camera 3 may take one image of the entrance and exit area of the building 2, or a series of images over a time period, as will be further described below.

Figure 2:
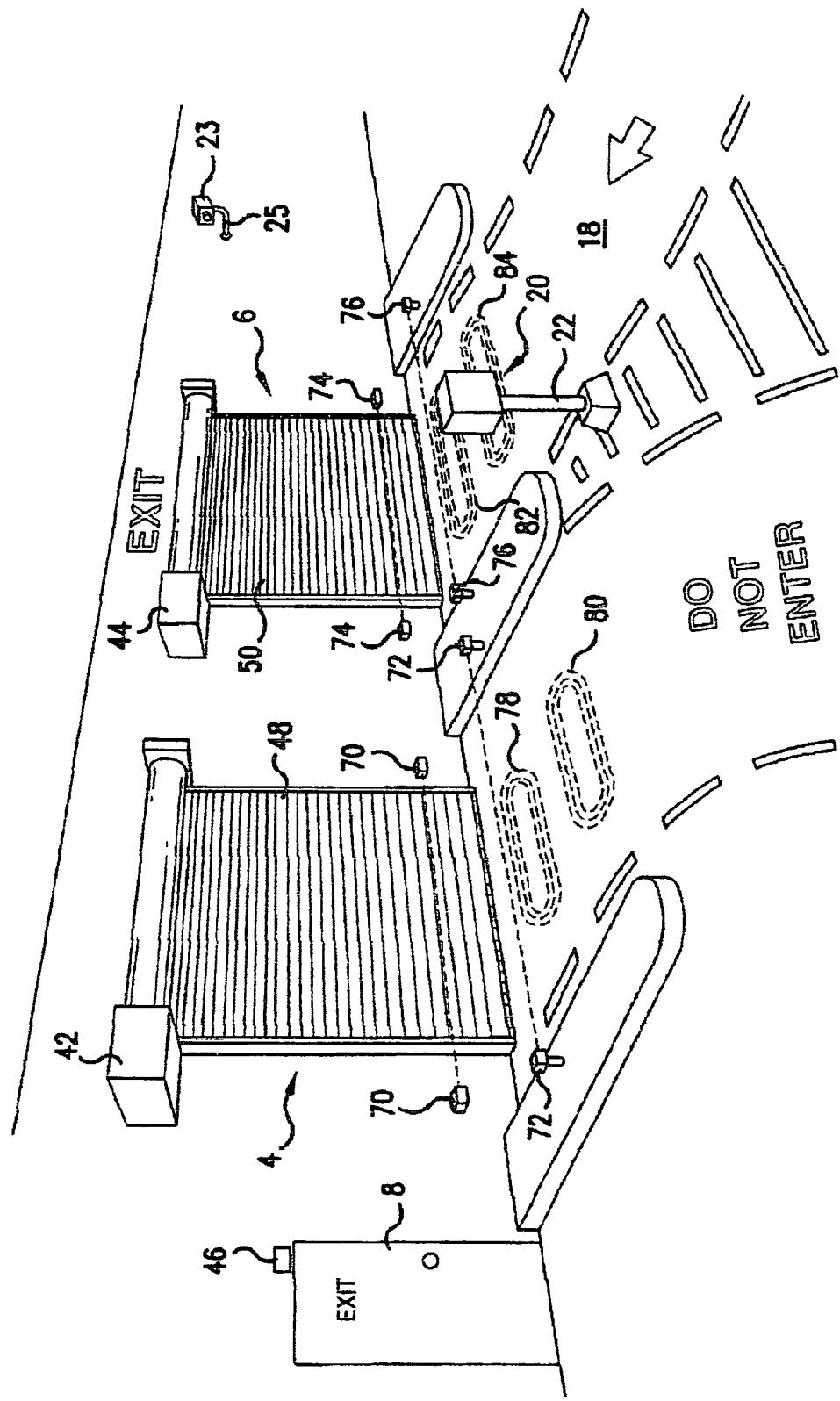
FIG. 2 is an inside perspective view of the parking garage entrance and exit area for vehicles and foot traffic.

FIG. 2 is a perspective view of the vehicle entrance and exit area taken from inside the parking garage. An exit lane 18 leads to the vehicle exit 6. A third customer terminal 20 is located alongside the exit lane 18. The third customer terminal 20 is mounted on a post 22, which is situated on a driver's side of the exit ramp 18.

A second camera 23 is provided on a post 25 attached to an interior wall of the building 2. While a post is mentioned, the camera 23 could instead be mounted on a wall, a pedestal, or the ceiling; all such variations are contemplated as being within the scope of the present invention. The second camera 23 has a view of the inside portions of the vehicle entrance 4, the vehicle exit 6 and the access door 8. The second camera 23 may take one image of the entrance and exit area of the building, or a series of images over a time period, as will be further described below.

Figure 3:
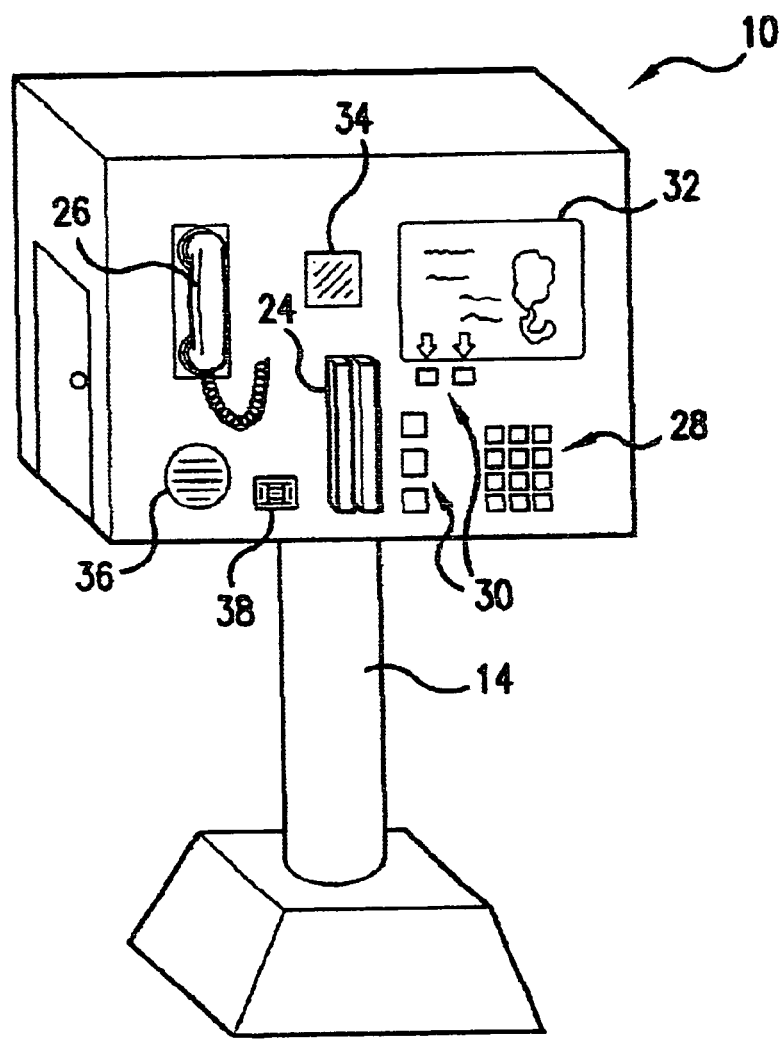
FIG. 3 is a front view of a customer terminal.

FIG. 3 illustrates a configuration for the first, second and/or third customer terminals 10, 16, and 20. Each customer terminal would include at least a card reader in the form of a pull through slot 24 (as commonly used in grocery store checkout lanes) or an insert/withdraw slot (as commonly used at pay gas pumps). The card reader could be used for reading one or more types of cards, such as a magnetic strip or bar code provided on a credit card, a driver's license, etc. Additionally, the card reader can be a contact reader of a type now used for example by AmEx®, with gasoline credit cards at some gas stations, for keyless entry automobiles, and at metro stations in the Washington, D.C. area.

Further, each customer terminal could include a telephone handset 26 for voice communications, a numeric or alphanumeric input keypad 28, a plurality of function keys 30, a video display 32, and a camera 34. Of course, the handset 26 could be replaced with a hands-free speakerphone, such as a speaker 36 and a microphone 38. Communication with the remote operator could also be by cell phone. Further, the keypad 28 and function keys 30 could be replaced with a touch sensitive graphics display provided on the video display 32, or a computer input to interface with a personal digital assistant (PDA) or laptop or cell phone.

Figure 4:
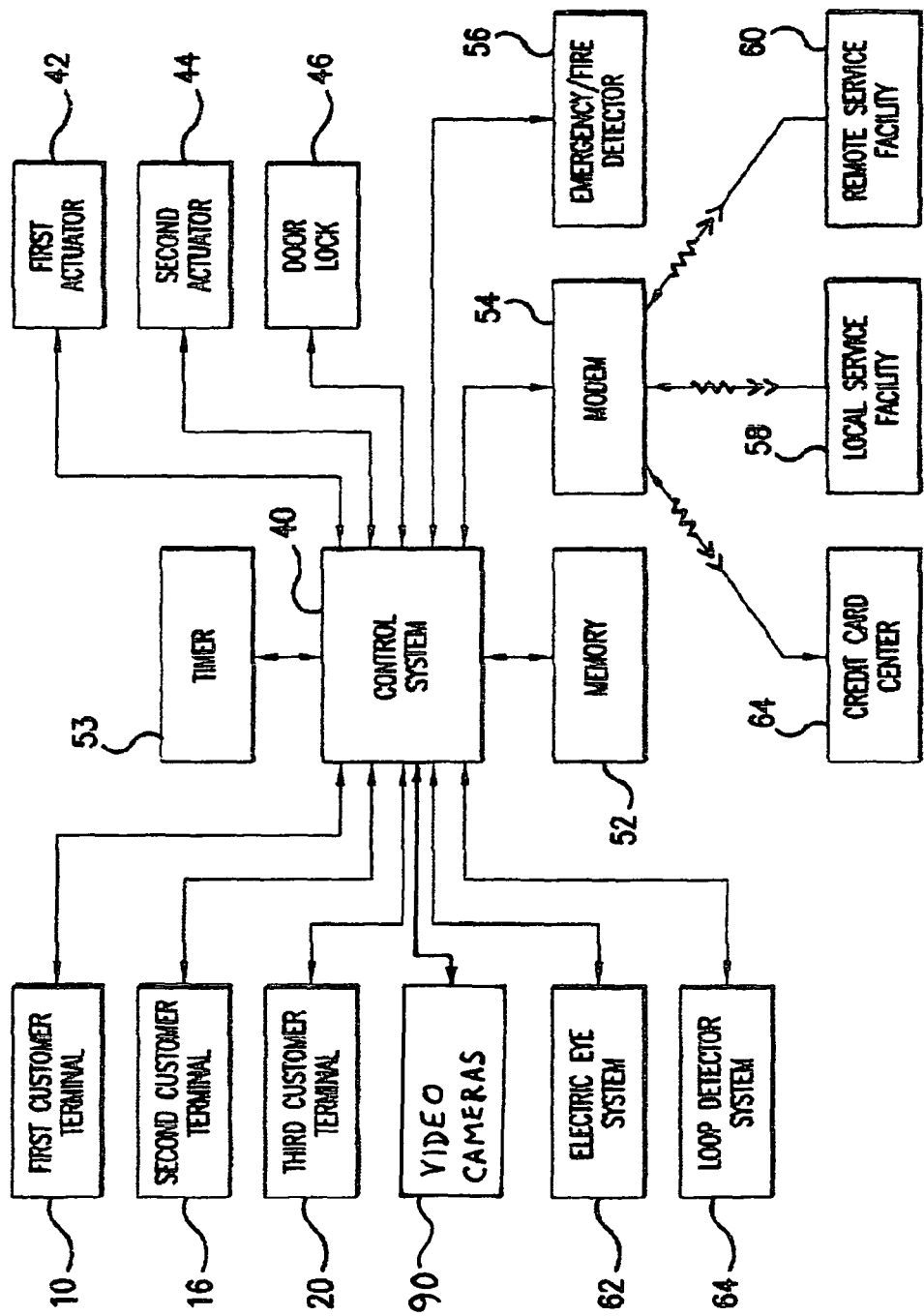
FIG. 4 is a block diagram illustrating an interconnection between various components of the parking area control and management system of the present invention.

FIG. 4 is a block diagram illustrating the interconnections between various components of the present invention. The first customer terminal 10, second customer terminal 16 and third customer terminal 20 are connected to a control system 40. The connections may be hardwired or wireless.

The controller 40 is also connected to a first actuator 42, a second actuator 44 and a door lock 46. The first actuator 42 controls opening and closing of a first gate or door 48, serving as a barrier to the vehicle entrance 4. The second actuator 44 controls opening and closing of a second gate or door 50, serving as a barrier to the vehicle exit 6. The door lock 46 controls the locking of the foot traffic door 8. For example, the door lock 46 could drive a solenoid for withdrawing a dead bolt, and hence unlocking the pedestrian door 8. Alternatively, the door lock 46 may be an electromagnet, which holds the door 8 locked when energized, and which releases the door 8 when de-energized.

As also illustrated in FIG. 4, a memory 52 and a timer 53 are connected to the control system 40.

The memory 52 could be a hard drive integrated into, or in the proximity of, the control system 40, or alternatively could be a remote memory device, such as a memory space allocated/at a local personal computer or service provider connected to the control system 40 via a modem 54 over the Internet. Also, the timer 53 could be integrated into the control system 40.

An emergency/fire detector 56 is also connected to the control system 40. The emergency/fire detector 56 could be a collection of fire sensors and pull alarms located in the garage area. More preferably, the emergency/fire detector 56 is tied into a master management system of the building 2, and hence would signal trouble to the control system 40 under the circumstance of any emergency within the building 2. In an emergency condition, the vehicle barriers 48, 50 and door 8 could be held opened, as for a bomb threat, or could be held locked, in response to a child-abduction in the building 2.

A credit card center 64 may also be connected to the control system 40, directly or via the modem 54, as will be further discussed below. A local service facility 58 is connected directly to the control system 40, or connected to the control system 40 via the modem 54. The local service facility 58 could be manned a security person located onsite of the building 2, such as at a guard desk in the lobby of the building 2. Alternatively, or in addition, a remote service facility 60 could connected directly to the control system 40, or connected via the modem 54. The remote service facility 60 would be located offsite, and would service the parking garages of several different buildings 2.

As also illustrated in FIG. 4, a presence detector, such as an electric eye system 62, is connected to the control system 40. The electric eye system 62 includes one or more transmitter/receiver sets, arranged proximate the vehicle entrance 4 and/or exit 6. In FIG. 2 a first transmitter/receiver set 70 is located closer to the first barrier 48 of the vehicle entrance 4, as compared to a second transmitter/receiver set 72. Therefore, a vehicle or person entering via the vehicle entrance 4 will trigger the first transmitter/receiver set 70 prior to triggering the second transmitter/receiver set 72. Each transmitter/receiver set 70, 72 is located sufficiently high so that it is unlikely that a pedestrian will step over the light beam. Yet, each transmitter/receiver set 70, 72 is not located so high that the light beams will pass over a vehicle.

The electric eye system 62 may be embodied as an infrared light beam transmitter and receiver for detecting the passage of vehicles or people past the vehicle entrance 4. Of course, other types of electric eye systems may be employed to detect the passage of vehicles or people past the vehicle entrance 4, such as an ultra-sonic transmitter/receiver set. As illustrated in FIG. 2, the electric eye system 62 may also include third and fourth transmitter/receiver sets 74, 76, arranged proximate the vehicle exit 6, to detect the passage of vehicles and people past the vehicle exit 6, in a like manner.

As also illustrated in FIG. 4, a loop detector system 64 is connected to the control system 40. The loop detector system 64 includes one or more loop detectors, arranged proximate the vehicle entrance 4 and/or exit 6. In FIG. 2, a first loop detector 78 is located closer to the first barrier 48 of the vehicle entrance 4, as compared to a second loop detector 80. Therefore, a vehicle entering via the vehicle entrance 4 will trigger the first loop detector 78 prior to triggering the second loop detector 80. In typical installations, the loop detectors also act as the inside and outside safety loops for the door or gate.

The loop detectors 78, 80 may be embodied as coils of wire, which act as metal detectors. A large amount of metal, characteristic of a vehicle, will influence a current in the coil of a loop detector, and indicate the presence of a vehicle. Of course, other types of loop detectors may be employed to detect the presence of a vehicle, such as a weight sensor. A typical weight sensor would include a loop-shaped area formed in the entrance ramp which transmits a surface weight to a sensor beneath, such as a piezo-electric strain gauge. As illustrated in FIG. 2, the loop detector system 64 may also include third and fourth loop detectors 82, 84, arranged proximate the vehicle exit 6, to detect the passage of vehicles past the vehicle exit 6, in a like manner.

Also as shown in FIG. 4, a video camera or cameras 90 are provided. This video camera 90 captures frames of information for each "event" recorded by the system of the present invention. It is contemplated that more than one camera can be used to capture images during such events, and there is no reasonable limit to the number of cameras which can be used. Additionally, the camera 90 can be controlled to pan, tilt, and/or move in a manner known in the security camera arts, to capture events. The capture of events is in a pre-programmed manner, and/or in response to manually controlled signals from a security officer or manager.

Figure 5:
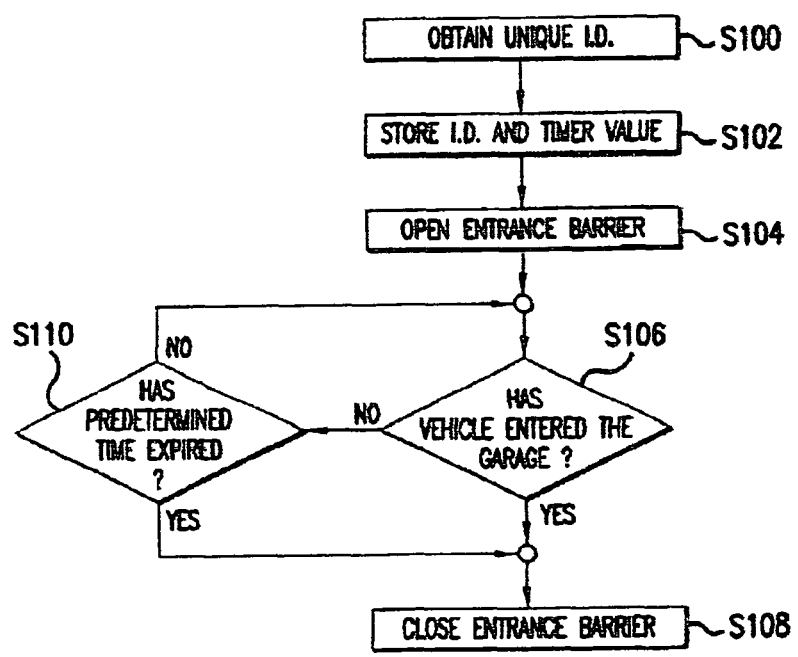
FIG. 5 is a flow chart illustrating a method of operation for allowing a vehicle to enter a parking area.

FIG. 5 is a flow chart illustrating a first aspect of operation for the present invention. The first aspect of operation relates to a vehicle or person's entrance into the parking area, e.g. parking garage. When entering the garage, a customer's vehicle approaches the first customer terminal 10 via the entrance ramp 12. The customer reviews rules posted at the first customer terminal 10 or at a billboard 66 attached to the building 2. The customer is instructed to present their driver's license or a credit card (hereinafter referred to as a customer's common card) to the card reader 24. In FIG. 3, the card reader 24 is provided in a pedestal-type customer terminal 10, and accessed directly by the customer. However, other types of customer terminals may house the card reader 24. For example, the card reader 24 may be provided in a customer terminal, taking the form of a customer counter or parking attendant's booth, and accessed by handing the card to an attendant.

In step S100, the card reader obtains unique identifying information from a bar code, magnetic strip or the like, on the customer's common card. It is not important that the control system 40 be able to actually identify the individual, but rather that the control system 40 simply be able to obtain unique data associated with the customer's common card.

In step S102, the control system 40 stores the read identification data in the memory 52 along with a timer value or timestamp, as taken from the timer 53. Then, in step S104, the control system 40 sends a signal to the first actuator 42 to open the first barrier 48 to permit the vehicle or person to enter the parking garage. In step S106, it is determined whether or not the vehicle or person has entered the parking garage using the loop detector system 64 or electric eye system 62. If not, the control system 40 goes to step S110. If so, the method proceeds to step S108 and the control system 40 sends a signal to the first actuator 42 to close the first barrier 48.

If the vehicle or person has not entered the parking garage, the control system 40 monitors the timer 53, in step S110, to see if a predetermined time has elapsed. For example, the predetermined time may be approximately 10 to 15 seconds. If the time since the opening actuation of the first barrier 48 has not yet exceeded the predetermined time, the process returns to step S106 to check if the vehicle has entered the parking garage yet. If the time since the opening actuation of the first barrier 48 has exceeded the predetermined time, the process goes to step S108 and the first barrier 48 is closed. This is a "time-out" procedure, whereby the first barrier 48 is not left open indefinitely.

Once a vehicle has entered and parked in the parking garage, it is customary for a person to leave the vehicle and go perform tasks in the building 2 or outside the building 2. In this regard, the person will need to exit the parking garage via a door leading to a street, stairway, or elevator room. FIGS. 1 and 2 illustrate a door 8 leading to a street. The door 8 is constructed to allow people to freely leave the parking garage. However, the door 8 is locked to prevent people from entering the parking garage. Of course, other similar doors 8 could be provided to control access to the garage from an elevator room, lobby, etc. The person could also exit or enter through the garage door.

Figure 6:
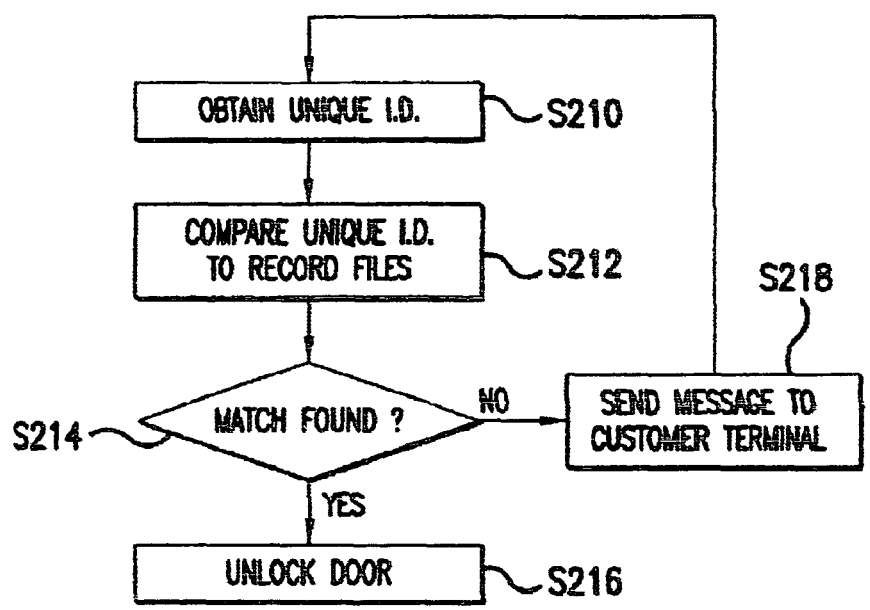
FIG. 6 is a flow chart illustrating a method of operation for allowing foot traffic into the parking area.

FIG. 6 is a flow chart illustrating a second aspect of operation of the present invention. The second method of operation relates to a person's ability to regain walking entrance into the parking garage. To regain entry into the parking garage, a person presents their customer's common card (e.g. driver's license or credit card) to the card reader 24 of the second customer terminal 16. In step S210, the card reader 24 of the second customer terminal 16 obtains unique identifying information from the bar code, magnetic strip, or the like of the customer's common card.

In step S212, the control system 40 compares the identifying information obtained in step S210 to the identifying information records stored in the memory 52. In step S214, it is determined if a match is found. If so, processing proceeds to step S216. In step S216, the control system 40 sends a signal to the door lock 46 to unlock the door 8, such as by withdrawing a deadbolt via a solenoid or de-energizing a magnetic lock. This allows the person to enter the garage.

If no match is found in step S214, processing proceeds to step S218. In step S218, a message is displayed to the person at the second customer terminal 16, via the video display 32, that the customer's common card presented was not previously used to gain access to the parking garage. The person is instructed to try again, or to call for assistance using the handset 26. The display could display a message that access is denied. This ensures that the person does not conclude that system cannot respond and is somehow defective.

For example, assume that a car rental agency has rental cars parked inside the parking area. If a person wishes to enter the parking area to obtain a rented car, the person will be asked to insert their customer card into a card reader 24 provided at the rental agency desk. The control system 40 will allow the person to enter the door 8, and perhaps a series of doors inside the parking area, so as to provide the person with an accessible path to the rental cars parked in the parking area. The control system 40 could also allow the person to exit the parking area with a rental car, using the same customer card.

Figure 7:
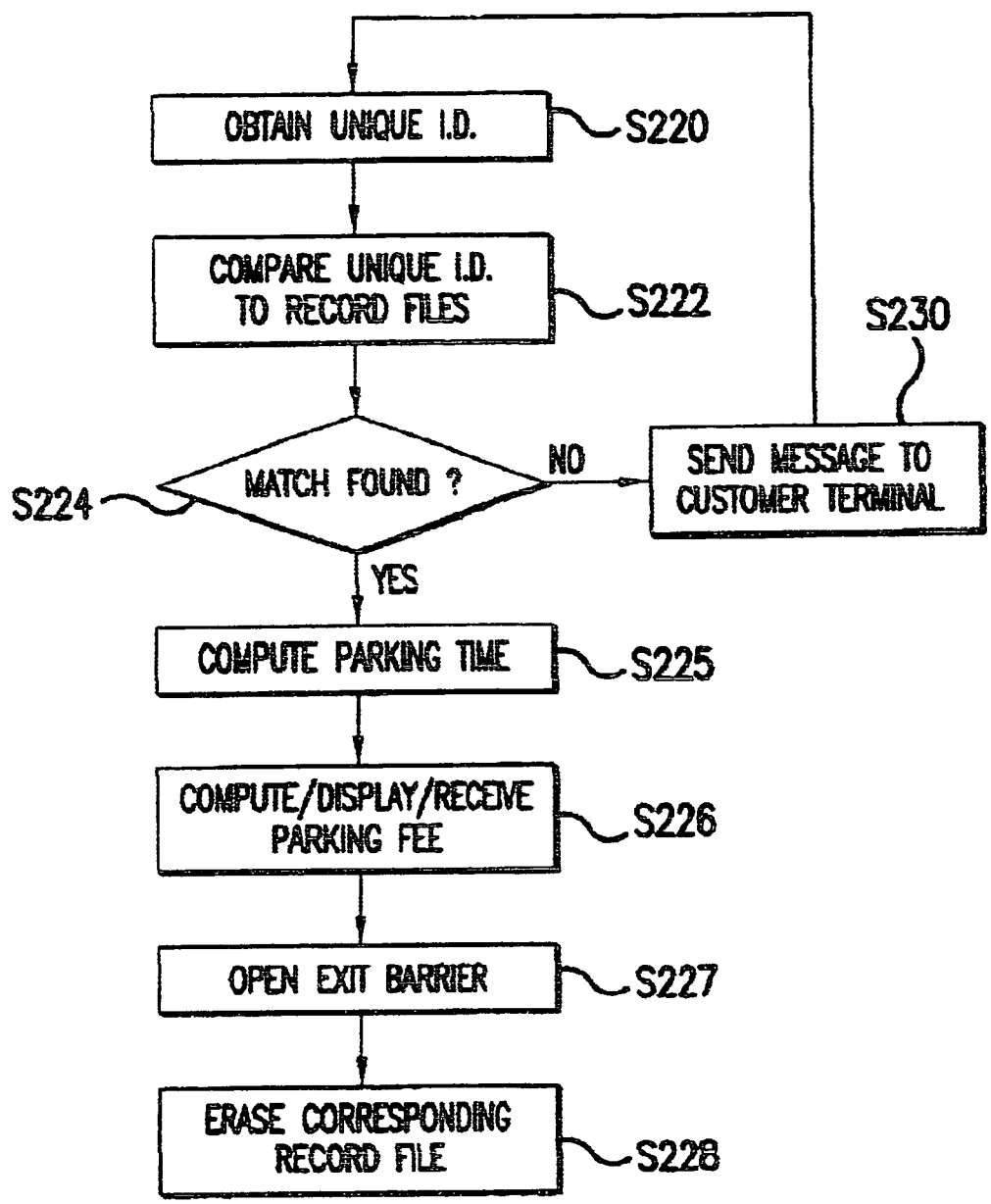
FIG. 7 is a flow chart illustrating a method of operation for allowing a vehicle to exit the parking area.

FIG. 7 is a flow chart illustrating a third method of operation for the present invention. The third method of operation relates to when the person exits the parking garage with their vehicle. To exit the parking garage, the person must present their customer's common card to the card reader 24 of the third customer terminal 20. In step S220, the card reader 24 of the third customer terminal 20 obtains unique identifying information from the bar code, magnetic strip, or the like of the customer's common card.

In step S222, the control system 40 compares the identifying information, obtained in step S220, to the identifying information records stored in the memory 52. In step S224, it is determined if a match is found. If so, processing proceeds to step S225. In step S225, the timer value stored along with the matching identifying information record is compared to a present value of the timer 53 and a total parking time is computed.

Next in step S226, a charge for the parking service is computed and displayed to the person at the third customer terminal 30, via the video display 32. The customer then pays for the parking service, either by cash or credit card to the third customer terminal 30 or an attendant, or by putting the charge on an account. After payment is settled, in step S227, the control system 40 sends a signal to the second actuator 44 to open the second barrier 50, and allow the vehicle to exit. Next, in step S228, the control system 40 erases the matching identifying information record from the memory 52. Alternatively, the control system 40 can flag the matching identifying information record. A flagged identifying information record can be erased after some period of time, for example ten days, or can be archived for later use.

If no matching identifying record is found in step S224, processing proceeds to step S230. In step S230, a message is displayed to the person at the third customer terminal 20, via the video display 32, that the customer's common card presented to the card reader 24 of the third customer terminal 20 was not previously used to gain access to the parking garage. The person is instructed to try again, or to call for assistance using the handset 26. or to his/her cell phone. A video image of the person can be taken, via the camera 34 of the third customer terminal 20. This video image can be stored in the memory 52, so that should a criminal event later be uncovered, the video image of the person can be retrieved.

The above described system and method of operation offers many advantages in the monitoring and control of a parking garage. First, the system makes is difficult for a person to enter the parking garage, unless that person has a vehicle parked in the parking garage. This reduces the likelihood of having criminals enter the parking garage and causing injury or damage to persons or property in the parking garage.

Second, the system works in cooperation with a person's credit card or driver's license.

Presumably, all persons parking a vehicle in the parking garage should have in their possession their driver's license, and most people would have a credit card. Therefore, the parking control system is operating, based upon a card which is already in the possession of the parking patrons. There is no need to create, issue or update any dedicated parking card, which saves time and money for the parking service provider and parking customer. Further, parking customers need not carry an additional card for parking services.

One particular drawback of the prior parking control systems was that parking customers left their parking slips or parking cards in their parked vehicles. This occurrence is highly unlikely in the present system. People are very much in the habit of keeping their credit cards and driver's license in their wallets or purses, and would be very unlikely to leave their credit card or driver's license behind in a parked vehicle. Therefore, should a thief steal a vehicle from the parking garage, the thief would not have a credit card or driver's license with a matching identifying record stored in the memory 52. Therefore, the thief would call attention to himself when trying to leave the parking garage, and a video image of the thief would be stored in the memory 52.

Of course, a paper slip could still be issued by the parking control system of the present invention. However, the paper slip would not be used to exit the parking area, but would serve to identify the parking area, such as by address or a service provider's name. Such a slip could be carried by the parking customer to remind them where their vehicle is parked.

Although a credit card may be employed by the system, a person's credit card number might only be used to uniquely distinguish the person. It would not be necessary to identify the person, validate the credit card, or make any charge to the credit card. Rather, the credit card is used to make a unique identification record to be stored in the memory 52. Of course, if credit cards were used, it would be possible to charge the credit card for the parking services, if the customer desired. It would also be prudent to capture a partial record of the credit card information such as the last four digits so as to not create a hackable and valuable date record.

If a problem occurs at the parking area, such as a theft, vandalism, robbery, assault, etc., then the credit card account information on file at the time of the event could be used to track down the holders of the driver's licenses or credit cards. In this way, it is possible to reconstruct a list of those persons who may have been injured, suffered a loss of property, witnessed a crime, or be a suspect in the crime.

Of course, there will be special circumstances where a different person, not in possession of the customer's common card, will legitimately need to remove a vehicle form the parking garage. Take for example, the instance where a person has driven their vehicle to the parking garage, parked, and then left on a business trip. A spouse picks up the vehicle, later that day. The spouse would be unable to use the same customer's common card to gain entrance into the parking garage, via the door 8.

However, the spouse could speak with a guard, or remote service person, via the handset 26 or cell phone and explain the situation. The guard could then instruct the person to insert another customer's common card into the card reader 24 of the second customer terminal 16. The control system 40 would respond to customer's common card, and an override command issued by the guard or remote service facility 60, and would unlock the door 8 and create a new identifying information record in the memory 52. By this arrangement, the spouse could exit the parking garage using the spouse's customer's common card at the third customer terminal 20.

One particular advantage of the present invention is that data surrounding such special circumstances can be collected and stored for some time. For instance, driver's license information of the alleged spouse could be maintained for several days so as to make sure that no vehicle was stolen during the same time period. Further, the first and second video cameras 3, 23 mounted to view the vehicle entrance and exit area, and the video camera 34 of the customer terminals, can be used to store video images of the person or persons who needed special attention in order to gain entrance into, or exit from, the parking garage. Such measures go along way toward preventing and deterring persons from committing crimes, since their crimes are no long anonymous, and the likelihood that they will be later identified are greatly increased. To this end, it is envisioned that brief video images of all persons entering and exiting the parking garage could be stored for some short period of time. If no unusual circumstances surface in the following several days, the video images would be overridden.

Another common problem in conventional parking area management and control systems involves "tailgaters." A "vehicle-type tailgater" involves an unauthorized vehicle closely following an authorized vehicle past the entrance barrier 48 and into the parking area. To exit the parking area, the unauthorized vehicle repeats the tailgating maneuver, and closely follows an authorized vehicle out of the parking area. "Vehicle-type tailgating" leads to lost revenues for the parking service provider. Further, the unscrupulous person who commits "vehicle-type tailgating" is not uniquely identified by the above-described methods of FIGS. 5-7. Therefore, that person could commit a crime inside the parking area and leave the parking area, not having left a recoverable record of their identity.

It is also possible for a person to inadvertently follow an authorized vehicle into a parking area. For example, sometimes the gate or door will remain open a sufficiently long time after an authorized vehicle enters a parking area, which leads a following vehicle to assume that the facility is open for business. The following person then enters the parking area, and is deemed an "inadvertent" tailgater. The inadvertent tailgater will have problems leaving the parking area since no record of their entrance into the parking area was created. In fact, if the parking area barrier is unattended, the inadvertent tailgater is essentially trapped in the parking garage. The system as invented can handle this recurrent condition. Upon an attempt to exit by foot or by vehicle, the trapped customer can call the operations center, explain the predicament and be "let-out". The operator letout sequence can include the taking the name of the individual, recording his license plate number verified through the associated camera and any other information deemed important and enter it into the letout log in the system.

Another common problem in conventional parking area management and control systems involves "pedestrian-type tailgaters." To enter a parking lot, an unauthorized person closely follows behind an authorized vehicle entering the parking area. By this maneuver, the person gains access to the parking area and bypass the security check of the second customer terminal 16, provided by the foot traffic access door 8. Again, the "pedestrian-type tailgater" is not uniquely identified by the methods of FIGS. 5-7, and could commit a crime inside the parking area with some degree of anonymity.

Figure 8:
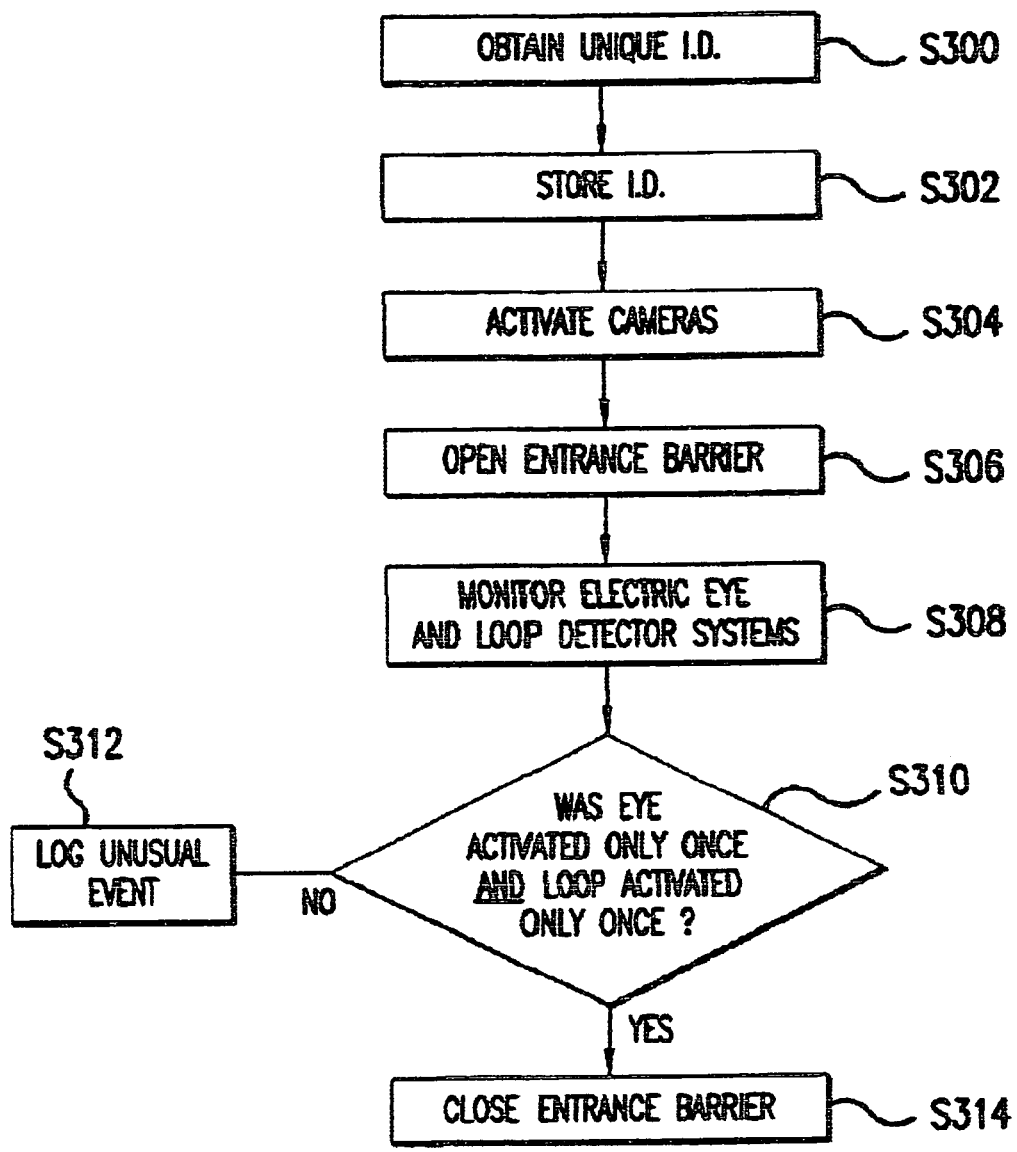
FIG. 8 is a flow chart illustrating a method of operation for discovering vehicle-type and pedestrian-type tailgating into the parking area.

FIG. 8 is a flow chart illustrating a further aspect of operation of the present invention, which enhances the security of the parking area by detecting vehicle-type and pedestrian-type tailgating. In step S300, the unique identifying information is obtained from the customer's common card, via the card reader 24 of the first customer terminal 10. In step S302, the unique identifying information is sent to the control system 40 and stored in memory 52. Next, in step S304, the first camera 3 and the second camera 23 are activated. By activating the first and second cameras 3, 23, it is possible to store video images of the vehicle entrance and exit area.

Next, in step S306, the entrance barrier 48 is opened. Then, in step S308, the outputs of the electric eye system 62 and the loop detector system 64 are monitored while the entrance barrier 48 is opened (see steps S106 and S110, in FIG. 5), and the process goes to step S310. In step S310, if the first loop detector 78 is activated only once and the first electric eye 70 is activated only once, prior to the first barrier closing, the control system 40 determines that only one authorized vehicle entered the parking garage, and the process goes to step S312, otherwise, the process goes to step S314. In step S314, the control system 40 sends a signal to the first actuator 42 to close the entrance barrier 48.

In step S312, the control system 40 notes that an unusual event has occurred. A log of the unusual event is stored in the memory 52. For example, if the first electric eye 70 was activated more than once and the first loop detector 78 was activated more than once, it is highly possible that a vehicle-type tailgating occurred. If the first electric eye was activated more than once and the first loop detector was activated only once, it is highly possible that a pedestrian-type tailgating occurred.

Whenever an unusual event occurs, as defined by the system program in response to the signal sequence and duration, the control system 40 will send an alarm signal to the local service facility 58 and/or the remote service facility 60. The video images of the first and second cameras 3, 23 will be stored in the memory 52. The images may be later evaluated by authorized personnel to determine if a vehicle-type tailgating or pedestrian-type tailgating actually occurred. Further, the images can be used to reveal the license plate and/or identity of the vehicle of person performing any vehicle-type or pedestrian-type tailgating.

If a vehicle has normally entered the parking area, as in step S314, the system can flag the video images. The flagged video images can be stored in the memory 52 for some period of time, e.g. ten days. However, it is envisioned, from a practical standpoint, that flagged images will eventually be erased or overwritten. By saving all video images for some period of time, it is possible to reconstruct comings and goings of vehicles relative to the parking area, should some criminal event surface later. For example, if an assault is reported to the parking service personnel several hours after it actually occurred, the video images would be available to determine the identities of vehicles entering and exiting the parking area around the time of the incident.

If desired, the electric eye system can include a second transmitter/receiver set 72 offset laterally from the first transmitter/receiver set 70. The second transmitter/receiver set 72 makes it highly unlikely that a pedestrian will pass by the electric eye system 62 undetected, such as by stepping over the light beam. Further, by providing a laterally displaced second transmitter/receiver set 72, the control system 40 can determine the direction of movement of the pedestrian, i.e. whether the pedestrian entered the parking area as an authorized vehicle entered, or whether the pedestrian exited the parking area, via the entrance, as an authorized vehicle entered the parking area.

Also, if desired the loop detector system 64 can include a second loop detector 80 offset laterally from the first loop detector 78. By providing a laterally displaced second loop detector 80, the control system 40 can determine the direction of movement of a vehicle, i.e. whether the vehicle entered the parking area when the entrance barrier 48 opened, or whether the vehicle exited the parking area when the entrance barrier 48 opened.

It is also envisioned that multiple transmitter/receiver sets 74, 76 and multiple loop detectors 82, 84 could be employed in conjunction with the vehicle exit barrier 50. By this arrangement, a method similar to FIG. 8 could be employed to detect, and record video images of, vehicle-type tailgating and pedestrian-type tailgating at the vehicle exit.

The drawings have illustrated one entrance barrier 48, one exit barrier 50 and one pedestrian door 8. Of course, in practice, the parking garage could include a plurality of entrance and exit barriers, and a plurality of pedestrian doors 8, with each having a customer terminal cooperating with the control system 40. Further, the parking area could have a single barrier that allows both pedestrians and vehicles to enter and exit.

Further, the drawings have illustrated a parking garage; however the same advantages of the invention could be obtained with a parking lot. For example, a fenced-in, surrounded parking lot could be provided with vehicle barriers and pedestrian gates to control and monitor the parking lot in a manner similar and analogous the system describe above in relation to the parking garage.

By the present invention, a card reader outside of a parking area barrier, acting in combination with inside and outside loop detectors and electric eyes (typical safety controls for doors and gates), can be organized by a control system to trigger alarms and cameras when non-normal sequences occur. The programming of the control system, in accordance with the present invention, opens a timed window to allow a pedestrian to enter a garage to retrieve their vehicle, even after the garage closes, yet the control system stays vigilant to detect tailgaters and unauthorized pedestrians.

Figure 9:
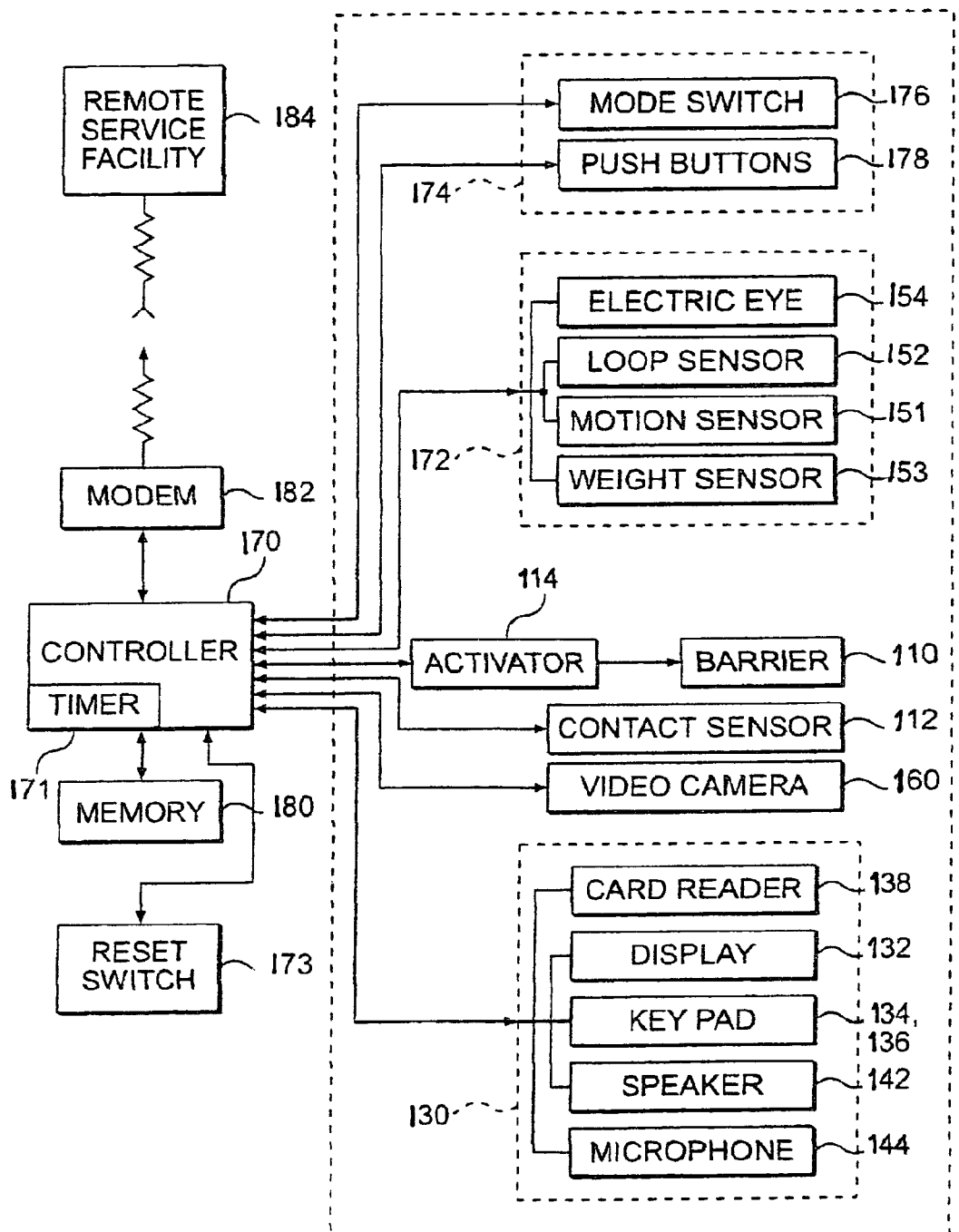
FIG. 9 is a block diagram illustrating various component of a control system of a parking area.

FIG. 9 illustrates a block diagram of a control system for the present invention. FIG. 9 illustrates a controller 170, which manages the operations associated with the first barrier 110. Of course, the controller 170 would also manage the operations associated with a second barrier (not shown) and second customer terminal, as well as other barriers, customer terminals, and attendant booths of the parking area. A memory 180, a modem 182 and a timer 171 are connected to, or formed integrally with, the controller 170. The modem 182 allows the controller 170 to communicate with a remote service facility 184.

The features of the first customer terminal 130 are connected to the controller 170 via hardwiring or a wireless connection. Further, the first actuator 114 for causing movement the first barrier 110 is connected to the controller 170. The first edge sensor 112 and the first video camera 160 are also connected to the controller 170. One or more vehicle detectors 172 (such as the electric eye system 154, the loop sensor 152, a motion sensor 151, and/or a weight sensor 153) are connected to the controller 170. An example of the referenced "controller" is the iPortal™ Manager and Programmable Logic Controller model SDS-0400IP™.

The attendant's booth 174 includes controls, which are manually operable by the attendant, such as the mode switch 176, the push buttons 178 and a reset switch 173. The push buttons 178 are momentary switches, which if pressed by the attendant, cause one of the barriers to cycle, i.e., open and close. The mode switch 176 is used to set the operation mode of the parking area. For example, when the mode switch 176 is in the "day" mode, the attendant controls the barriers by using the push buttons 178. When the mode switch 176 is in the "free" mode, the barriers remain open, so that vehicles may pass by freely. Alternatively, when the mode switch 176 is in the "automated" mode, the automated features of the customer terminals 130 are used to control operation of the barriers. The controller 170 will record the date and time when a particular mode was selected and store this data in the memory 180.

As illustrated in FIG. 9, the connections between the controller 170 and the various accessories concerning the operations of the barrier 110 can be two-way connections. In other words, the controller can both send to, and receive signals from, the various accessories. In a preferred embodiment, the circuitry employed in the various accessories, such as the electric eye 154, actuator 114, card reader 138, etc. include self-diagnostic circuitry. The features of self-diagnostic circuitry are known in the existing arts, and reference can be had to the existing arts to determine the various constructions and operations of such self-diagnostic circuits.

During operation, the controller 170 will monitor the performance of the various accessories and determine whether the accessories are functioning properly. If a malfunction occurs during the operation of one of the barriers attached to the controller 170, the controller 170 will report the fault occurrence and identity of the faulty accessory to the central service facility 184 via the modem 182. Alternatively or in addition, the controller 170 could maintain a fault log in the memory 180, when a parking attendant enters a command via the keypad 134 on the customer terminal 130, the fault log could be displayed on the LCD screen 132.

Sending fault data via the modem 182 to a server or other central data storage, retrieval and management system provides a means by which the parking service company can be immediately informed of malfunctions in a parking barrier, so as to incur a minimal loss of parking revenue. Further, the parking service company will know the nature of the fault and will be able to dispatch only the necessary service personnel to correct the fault. Likewise, providing the display of the fault to a parking attendant on the premises, via the LCD screen 132, will enable the parking attendant to call only the necessary service personal, or possibly correct the fault himself.

With reference to the flow chart of FIG. 10, an operational embodiment of the present invention will be described. For simplicity of illustration, the flow chart illustrates a sequence of operations concerning an accident event logging and recording system for the first barrier 110. Of course, in practice, the system would log and record accidents, which occur with any of the entrance or exit barriers of the parking area.

In step S400, the system is in a ready state. In the ready state, the first barrier 110 is blocking the exit of the parking garage. The controller 170 awaits an interrupt signal. The interrupt signal indicates the presence of a vehicle. For example, one of the vehicle detectors 172 senses a vehicle, or an input is received by the first customer terminal 130. Once an interrupt signal is received, operation proceeds to step S402.

In step S402, data is accepted from the first customer terminal 130. For example, the customer reads instructions from the display 132, and inputs a pass code via the keypad 134. Alternatively, the customer may swipe a credit card or parking pass through the card reader 138, or may communicate with a parking garage attendant or the remote service facility 184 via the microphone 144 and speaker 142 or via his/her cell phone.

Based upon the data received in step S402, in step S404, the controller will analyze the input data, and/or any data received from the parking garage attendant or remote service facility 184, and determine whether the data is sufficient. If the data is insufficient, processing goes to step S406. In step S406, the parking garage attendant is called to assist the customer, or the customer is directed to return the parking garage and seek the assistance of a parking garage attendant. Then, the system returns to the wait state of step S400.

If the data in step S404 is sufficient, processing proceeds to step S408. In step S408, the controller 170 begins to receive video images from the video camera 160. Next, processing goes to step S410 where the controller sends a signal to the first actuator 114 indicating that the first barrier 110 should start opening.

Next, in step S412, the controller monitors the outputs of the vehicle detector 172 to determine when the vehicle reaches the predetermined distance d to the first barrier 110. Once the vehicle reaches the predetermined distance d to the first barrier 110, a "timer 1" of the timer 171 is started in step S414.

Next, in step S416, the controller samples the vehicle detectors 172 to determine whether or not the vehicle has completely exited the parking garage. If the vehicle detectors 172 indicate that the vehicle has not yet completely exited the parking garage, the controller 170 checks to see if the first edge sensor 112 has detected contact between the customer's vehicle and the leading edge of the first barrier 110 (step S418).

If the vehicle has completely exited the garage in step S416, processing proceeds to steps S420 and S422. In step S420, the first barrier is closed, and in step S422, the timer is reset and the video images are erased, archived, or flagged to be overwritten after a defined time period. Next, processing returns to step S400.

If contact is sensed in step S418 via an edge sensor (representing an abnormal condition) in the plane of the door, processing proceeds to step S424. In step S424, the timer 101 is stopped and the timer 101 value is stored in the memory 180. Next, in step S425, a position of the first barrier and movement direction of the first barrier, when the first barrier was hit, are determined. This may be accomplished by providing encoding marks on a shaft, which rotates in a first direction as the first barrier 110 is opening, and which rotates in a second, opposite direction as the first barrier 110 is closing. Positioning is well known in the art and is used to effect the top stop point and bottom stop point of a barrier.

The encoding marks on the rotating shaft can be read and counted by an encoding reader to determine the position of the first barrier 110, the direction of movement of the first barrier 110, and even the speed of movement of the first barrier 110. Encoders for determining the rotations, position, direction, and speed of rotating shafts, are known in the art inside and outside of the parking garage and fire door actuators, such as in the servo control systems art. All of this data is recorded and incorporated into the system logs.

Next, in step S426, the parking attendant is notified about the physical contact between the vehicle and the first barrier 110. Next, in step S428, the video images recorded by the video camera 160 and information concerning the vehicle/driver that actuated the barrier (e.g., parking card number, credit card number, etc. as provided to the customer terminal 130) are stored in the memory 180.

Of course, whenever the contact sensor 112 senses contact to the first barrier 110, movement of the first barrier 110 is stopped. Stopping the first barrier 110 could be accomplished by a brake. Alternatively, the actuator 114 could be signaled to stop the first barrier 110, and then to open the first barrier 110. In either event, further damage to the vehicle and/or first barrier 110 will be minimized.

Figure 10:
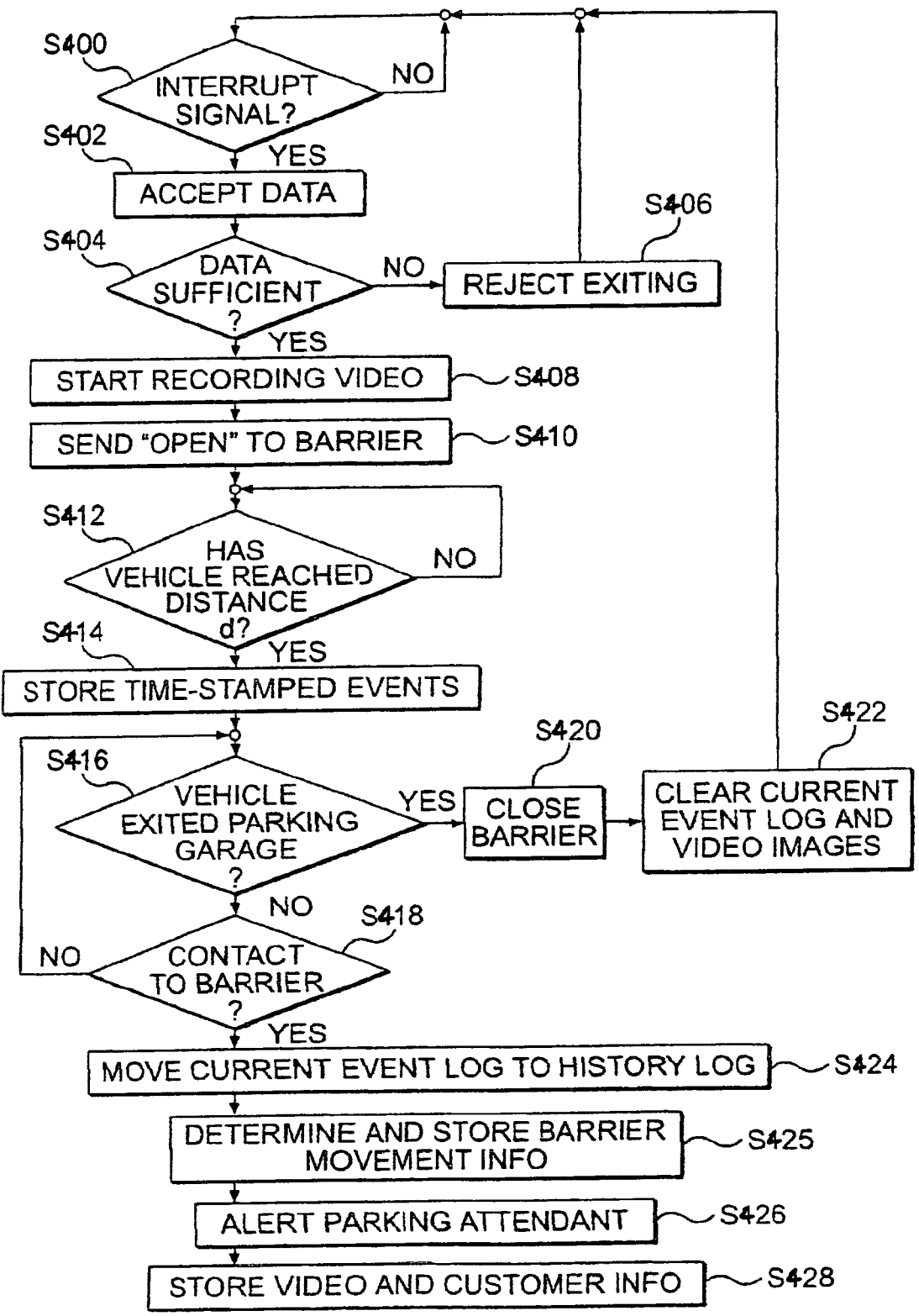
FIG. 10 is a flow chart illustrating a method of operation for the control system of FIG. 5.

In order to simplify the flow chart of FIG. 10, only the control steps concerning the first barrier 110 are discussed. In practice, the controller 170 would simultaneously control and monitor the operation of a second barrier (not shown), and could also control any other barriers of the parking garage. A like controller 170 would be used to control and monitor third and fourth barriers (not shown), for example, and any other bathers used at the parking lot. It is intended that the remote service facility 84 would service many such controllers 170 located at many parking garages and/or lots.

The operational method depicted in FIG. 10 is only one possible embodiment of the present invention. The operational method may be modified in many ways. The order of the steps could be altered. For example, steps S424, S425, S426 and S428 could occur in reverse order, or in any other order, such as S425, S428, S424, and then S426.

The control method depicted in the flow chart of FIG. 10 may be modified in many other ways, while remaining within the spirit of the present invention and scope of the attached claims. For example, step S422 could be optional. Under some circumstances, it may be desirable to store video images of the activities relating to a parking entrance or parking exit indefinitely, or for some length of time regardless of whether or not an accident event occurred.

Of course, the sampling of the vehicle detectors 172 (step S416) and the first edge sensor 112 (step S418) could be carried out simultaneously, or in a nearly simultaneous manner perhaps in milliseconds. Therefore, referring to FIG. 9, the controller 170 would be simultaneously monitoring for the vehicle to exit and for any contact between the vehicle and the first barrier 110.

FIG. 10 indicates that the control system stops after the data concerning the accident has been recorded. Presumably, the parking garage attendant would inspect the first barrier 110, and if appropriate, reset the system to start at step S400, if the first barrier were still functional.

Steps S424 and S428 indicate that the timer value and video images are stored in memory 180. Alternatively, the timer value and/or the video images could be transmitted via modem 182 to the remote service facility 184 to be viewed, stored and/or processed.

The time stored in step S424 represents the time it took for the vehicle to travel the known, predetermined distance "d" prior to striking the first barrier 110. Therefore, the stored time can be used to calculate an estimated speed of the vehicle, as the vehicle approached the first barrier 110.

By the present invention, it is possible to generate an accident log relating to an accident event when a customer's vehicle contacts a parking barrier. The accident log can include data relating to the accident event. The data may include video images of the barrier before, during and after the accident. Further, the data may include the direction of travel of the barrier (e.g., was the barrier going up or down when the contact occurred), the speed of movement of the barrier, and the exact elevation of the barrier when contact was initially made. Moreover, the data can include identification and timing information concerning the vehicle which contacted the barrier, such as the date and time of day when the accident occurred, the parking pass number or billing information that the customer entered into the customer terminal just prior to contacting the barrier, and an estimated speed of the vehicle when contact was made with the barrier.

The accident event log is a valuable asset to the parking area management company. Such a log may be useful as evidence to establish and/or rebut claims of property damage, personal injury, negligence, etc.

Figure 11:
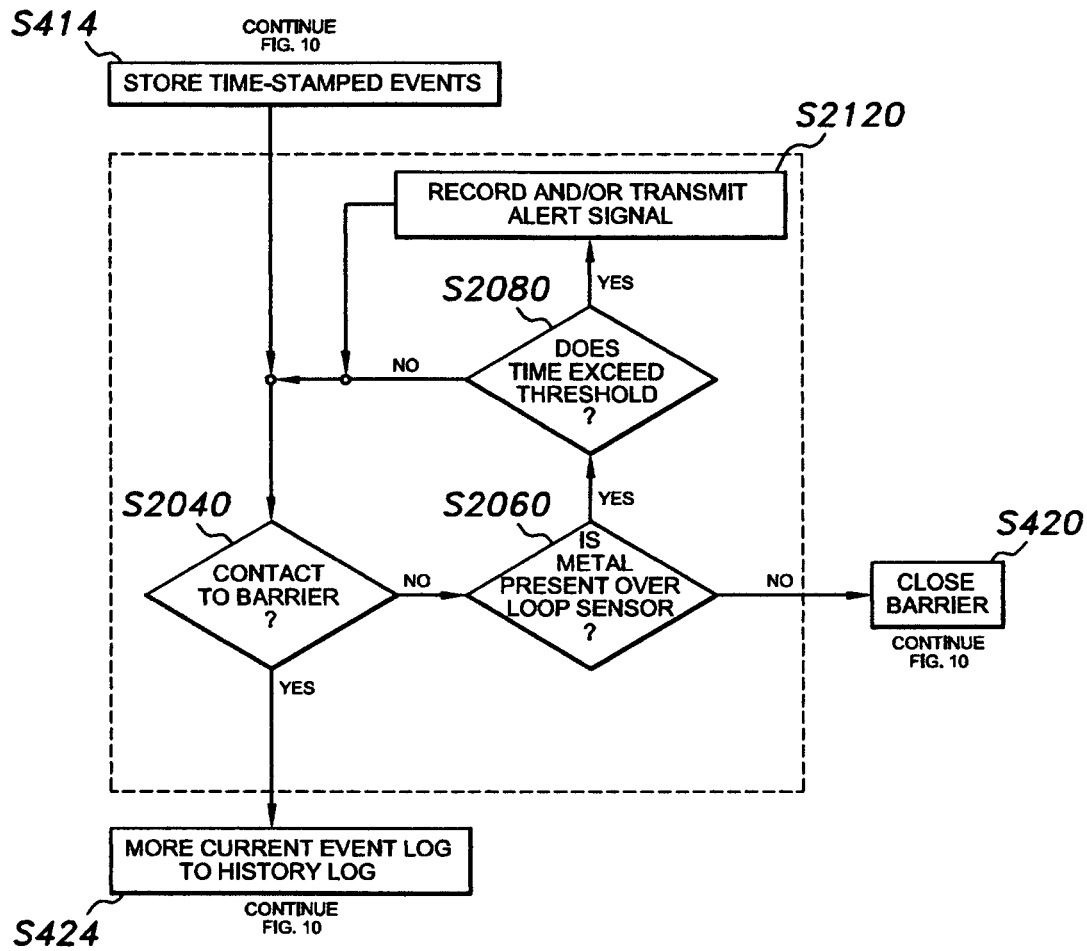
FIG. 11 is a flow chart illustrating additional method steps, which may be employed in the method illustrated in FIG. 10.

FIG. 11 is a flow chart illustrating an embodiment of a control method for the above system. The steps in FIG. 11 could replace the method steps S416 and S418 in FIG. 10. Of course, other method steps could be employed to ascertain whether or not the loop sensor 152 is activated for an excessive span of time.

In FIG. 11, after step S414 of FIG. 10, processing proceeds to step S202. In step S202 a "timer 2" is started by the timer 71. Next, in step S204, the controller 70 checks to see if the first edge sensor 12, or an electric eye, has detected contact between the customer's vehicle and the leading edge of the first barrier 10 (the step S204 is the same as step S118 in FIG. 10).

If contact is sensed in step S204, processing proceeds to step S124, and continues in accordance with FIG. 10. If contact is not sensed in step S204, processing proceeds to step S206. In step S206, the controller 70 checks the output of the loop sensor 52. If a sufficiently strong signal is sensed, a relatively large quantity of metal is proximate the first barrier 10. Normally, this would mean that a vehicle is present. If a weak signal, or no signal, is sensed, little or no metal is proximate the first barrier 10. Normally, this would mean that the vehicle has left the proximity of the first barrier 10.

If in step S206, the controller 70 concludes that the vehicle has exited the proximity of the first barrier 10, processing proceeds to step S210. In step S210, the controller resets timer 2, and subsequently sends a signal to the activator 14 to close the first barrier 10 in step S120. Processing then proceeds in accordance with the flow chart of FIG. 10.

If in step S2060, the controller 170 concludes that the vehicle is still proximate the first barrier 110, the first barrier 110 remains open and processing passes to step S2080. In step S2080, the controller 170 checks timer 102 and compares its value to a threshold value. If the threshold value is not exceeded, processing returns, or loops, to step S2040.

If the threshold value is exceeded in step S2080 the loop sensor 152 has been tripped for an excessive time period. The threshold value may be set at thirty seconds, one minute, or some other appropriate time, which would normally give plenty of time for a person to drive past the parking barrier. Once the threshold value is exceeded, processing goes to step S2120. In step S2120, an alert signal is sent to the remote service facility 184. The alert signal indicates that an abnormal event has occurred in that the loop sensor 152 has remained tripped for an excessive time period.

In FIG. 11, the alert signal is first sent to the remote service facility 184, after the loop sensor 152 is tripped for the excessive period of time. Further, the alert signal is repeatedly sent to the central service facility 184 until the loop sensor 152 is no longer tripped. Of course, this process could be modified, such that an alert signal is sent periodically, perhaps in five-minute intervals.

Further, the alert signal could be accompanied by timer 102's value, indicated a running total time that the loop sensor 152 is tripped. Or after the loop sensor 152 is tripped for an excessive period of time and the alert is sent to the central service facility 184, the next log event message to the central service facility 184 could be the loop is no longer tripped.

The remote service facility 184 will monitor the number of times a day that the loop sensor 152 is tripped for an excessive time period, and also will monitor how long the loop sensor 152 is tripped during each of those time periods. The remote service facility 184 can handle the situation in many ways, such as activating the camera 160 to view the first barrier 110; dispatching a security guard to the first barrier 110 to see if fraud is being committed by the attendant; dispatching a service person to the first barrier 110 to correct the problem; or calling the on-duty attendant to inquire about the problem.

Cumulative data concerning the loop sensor 152 or other accessories can be stored in the memory 180 connected to the controller 170, or in a memory connected to the remote service facility 184. The cumulative data may include the occurrence date and time when the activation period of the loop sensor 152 exceeded the threshold value, and the length of excessive time for each occurrence. Such cumulative data could be accessed on site or remotely via the modem 182. The data may prove useful in determining if a loop sensor 152 failure occurs more often when a certain employee is on duty, and may indicate that a different or new technique of defrauding the auditing system of the controller 170 has been developed and should be investigated.

Loading Dock

Figure 12:
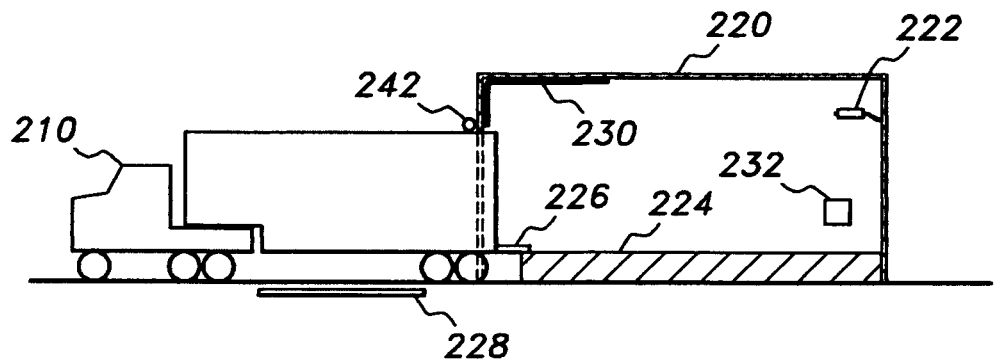
FIG. 12 is a schematic diagram of a loading dock showing a truck, camera, securement device, and sensors.

FIG. 12 is a schematic diagram of a loading dock 220 showing a truck 210, a camera 222, a securement device 226, normally called a truck restraint, and a platform 224. The loading dock 220 can have a movable door (not shown in FIG. 12) and includes a lift leveler 230 commonly called a dock leveler controlling access to the platform 224. A sensor 228 senses presence of a truck 210, and a dock door sensor 242 senses the position of the lift leveler 230.

An input terminal 232 is provided for use by loading dock personnel to enter their identifications, to indicate the activity or work being performed, and to allow input of other documentation such as documentation provided for the truck shipment including driver ID, truck ID, packages received, and so on. The camera 222 records events in a like manner indicated hereinabove with regard to FIGS. 1-11, and can be directed to pan, tilt, and/or move in a manner known to those skilled in the security camera arts.

It will be understood that there can be other doors to the loading dock 220, such as for entry of persons. Additionally, there can be other loading dock bays at the same location, either sharing the aforementioned camera 222, input terminal 232, lift gate 230, or alternatively each of such other loading dock bays can have its own platform area and optionally with its own lift gate door, camera, and input terminal. Thus, a large loading dock facility can be provided, using the security features described in the present invention. More than one camera can be provided at a given platform 224, and there is no reasonable limit to the number of cameras that may be employed.

The input terminal 232 can include any known security features such as the ability to read and store driver's license information, take pictures of handprints and perform iris scans, perform facial recognition, accept RFID information, or even accept cell phone ID information as the required ID for entry and egress from the facility. All these are within the ambit of anyone having skill in the security ID arts.

Figure 13:
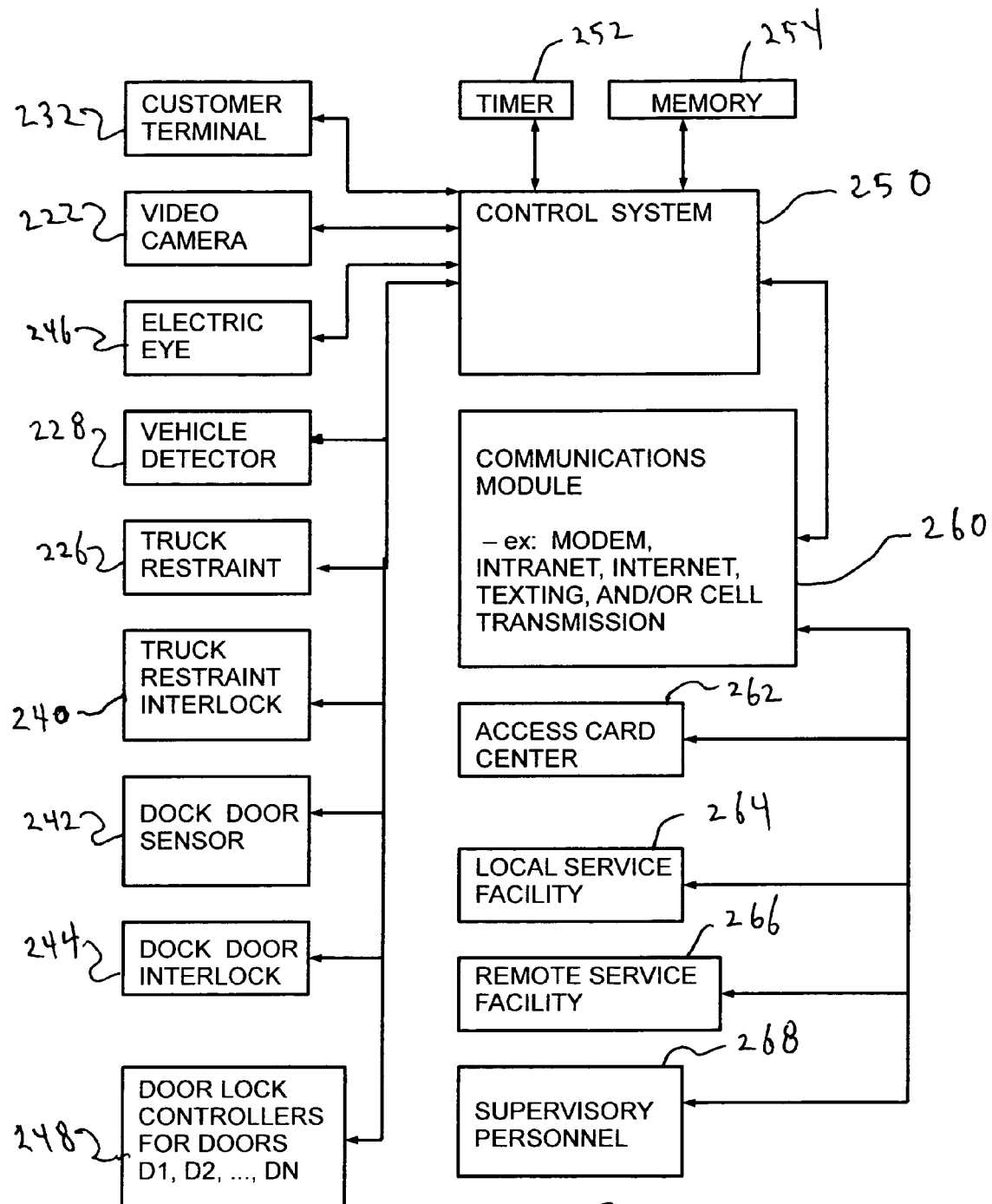
FIG. 13 is a schematic diagram of connections of elements usable in the loading dock of FIG. 12 integrated into a control and management system.

FIG. 13 is a schematic diagram of connections of elements usable in the loading dock of FIG. 12 integrated into a control and management system. Some, but not all, of the elements shown in FIG. 13 are depicted in FIG. 12, and it will be understood that FIG. 13—while having some different inputs and sensors—is otherwise similar to FIGS. 4 and 9 hereinabove, with a similar operation thereto. It will be understood that the depiction of sensors and other devices in FIG. 12 is merely representative and not exhaustive; FIG. 13 illustrates further such devices by way of further example.

For a loading dock management system, the events to be recorded can differ from those events recorded for a parking garage system. For example, entry and egress of persons will be recorded in like manner in both cases, but for the loading dock other sensors come into play. For example, the truck sensor 228 detects the presence of a truck 210, and also whether a securement 226 (truck restraint) is in a securement position to secure the truck 210 against rolling relative to the platform 224. The management system of the present invention enables those skilled in the trucking loading/unloading arts to define further relevant events. Collision sensors can also be included as well as other types of known sensing devices, and all such variations are contemplated as being within the scope of the present invention.

An important and significant value of the system set forth hereinabove is that the events are recorded and collated into a database of sortable events, so that all relevant information can be retrieved when checking a specific event. For example, a truck docking event will include sensor data showing the condition and position of all doors and sensors, the personnel on duty as well as pictorial evidence taken by cameras that shows exactly which truck, and which personnel, were actually present, among other data which can be of interest.

Significant events to be recorded at the loading dock 220 include the arrival and disposition of individual packages removed from the truck 210. The event of unloading the truck can be continuous, i.e. a frame or picture can be taken in one second intervals for example, or it can be discontinuous where a frame or picture is taken upon predetermined events such as scanning each individual package as it arrives to log it into the system. It happens that sometimes a package that is received is later mis-delivered, mis-stored, or simply lost somewhere. By recording the event of unloading of the individual packages, a picture is recorded which can greatly facilitate the finding of the lost package because the color, shape, and size of the package will be known from the pictures taken when it is unloaded and/or logged in.

As described above with regard to parking garage systems, other events recorded would include the entry and exit of personnel, as well as the opening of doors, arrival and departure of vehicles, and so on. Thus, all of the aspects of a parking garage system can be used for the loading dock, with the additional features shown and described with regard to FIG. 12 and FIG. 13 discussed hereunder.

FIG. 13 shows a control system 250 and a communications module 260 which are in communication with each other. The communications module 260 can additionally communicate with an access card center 262, a local service facility 264, a remote service facility 266, and supervisory personnel 268. The communications module 260 can communicate in any known manner including by modem, internet, intranet, microwaves, laser, and cell transmission among others. It will be understood that the communications module 260 may communicate with other services or locations than those shown, and can include fewer than those shown. The control system 250 and the communications module 260 are similar in purpose and function to those shown hereinabove with regard to FIGS. 1-11, and are not further described herein. The control system 250 communicates with a timer 252 and a memory 254 in known fashion. The control system 250 is capable of sending email and/or text message alerts to management or other security officers, upon detection of specific events such as door left open, fire alarm active, smoke detector alert active, and so on.

The control system 250 additionally communicates with the customer terminal 232, the video camera 222, the dock door sensor 242, the truck restraint 226, the sensor 228 which operates as a vehicle detector, the lift gate and other door controllers indicated collectively at 248, a dock door interlock 244, an electric eye 246 for sensing objects near the lift gate 230, and a truck restraint interlock 240. All of these work individually in a fashion known in the truck loading and unloading industries, and operation of these can be used as signals for an event within the meaning of the management control system according to the present invention. Additionally, such event causes recordation of the state of all of the devices connected with the control system.

Which single devices may be indicated in FIG. 13 connected to the control system 250, it will be understood that a plurality of such devices can be connected thereto. For example, the video camera 222 can represent a plurality of such video cameras. Within the control system 250, any of the cameras may optionally also pan, tilt, and/or move, as described hereinabove.

For example, if a theft occurs or there is a lost package, it would be useful for a manager or supervisor to be able to check each event (examples include unloading, opening of a door or portal, a malfunction report, or a timeout event, among many other possible types of events) to see all of the available information surrounding that specific event. Such available information is that provided by the sensors (presence sensors for vehicles, gate and door sensors showing positions thereof), as well as frames of video for that specific event). Thus, an unloaded package and the dock personnel handling that package will be visible in video frames at the "unloading" event, and may also be visible during "intruder" events, "malfunction" events, "scanning" events where bar codes of packages are scanned, etc.

Referring to the first example mentioned in the Background of the Invention relating to piecemeal solutions used in the prior art, by the present invention a camera system is advantageously provided and used as shown in FIGS. 12 and 13, and integrated into a system, such that it is controlled by the dock door being "not closed" and "safety eye activated" so that it would generate data only when activities relating to loading or unloading into a particular vehicle are actually occurring.

Referring to the second example mentioned in the Background of the Invention relating to piecemeal solutions used in the prior art, by the present invention as shown in FIGS. 12 and 13 a camera system is advantageously provided and used, and integrated into a system, such that it is controlled by input from personnel who activate the security seal cutting protocol by input to the iPortal™ Manager touchscreen or other user interface device such a magnetic strip on an employee ID badge that would create a labeled tag for the video or camera images. A breaking of the seal could also be recorded by cell phone camera with an associated application that would input the event into the system along with the seal ID number. Or, the seal ID number could be entered via touchscreen or activated during, the breaking of the security seal. Thus, various other data is associated by the present inventive system relating to this event, such as vehicle sensor data, shipping door position, other doors' positions, and video frame data, seal ID, seal integrity verification, etc. These items of information are all stored in such a way that they can be associated with specific events, and reports can be generated and the data can be reviewed by a manager or supervisor for such events. Thus, there is associated data when such security seals are broken, and thus the value of the security seal is greatly enhanced. A secure shipment tracking system is disclosed.

Fire Station

Figure 14:
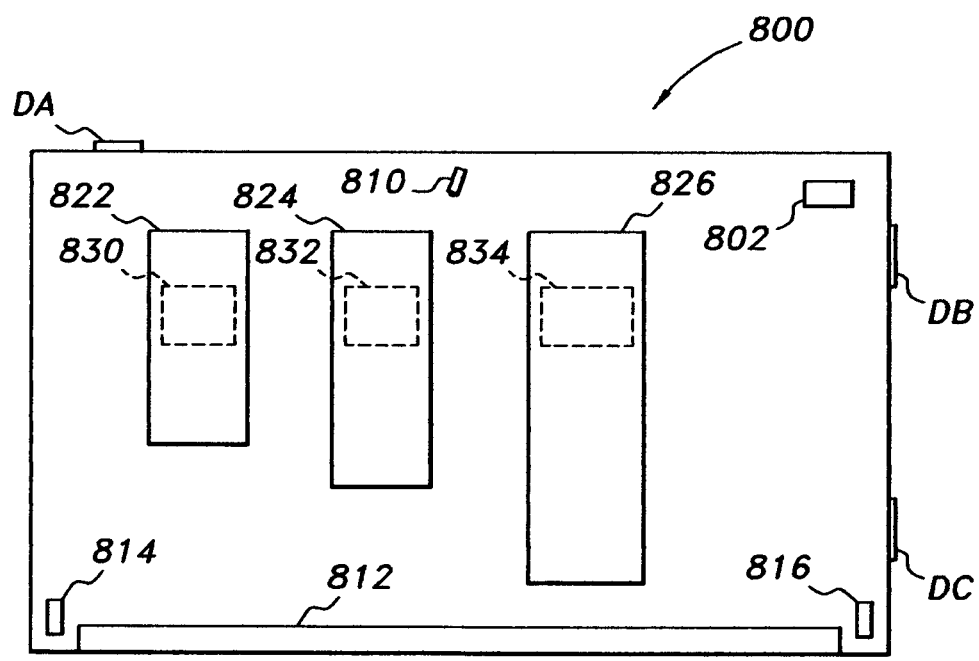
FIG. 14 is a schematic diagram of a fire station, showing fire trucks, door, camera, and sensors.

FIG. 14 is a schematic diagram of a fire station 800, showing fire trucks 824 and 826, a vehicle 822, a main truck door 814, a plurality of doors DA, DB, and DC for human access, a camera 810, and vehicle sensors 830, 832, and 834 for sensing the presence of a vehicle. A station terminal 802 is also provided which is similar to terminal 10 of FIG. 3 and to the terminal structure 130 of FIG. 9.

The terminal 802 can include any known security features such as the ability to read and store driver's license information, take pictures of handprints and perform iris scans, perform facial recognition, accept RFID information, or even accept cell phone ID information as the required ID for entry and egress from the facility. All these are within the ambit of anyone having skill in the security ID arts. The sensors and control system, as well as individual events to be recorded, are similar to those set forth hereinabove with regard to FIGS. 12 and 13.

Figure 15:
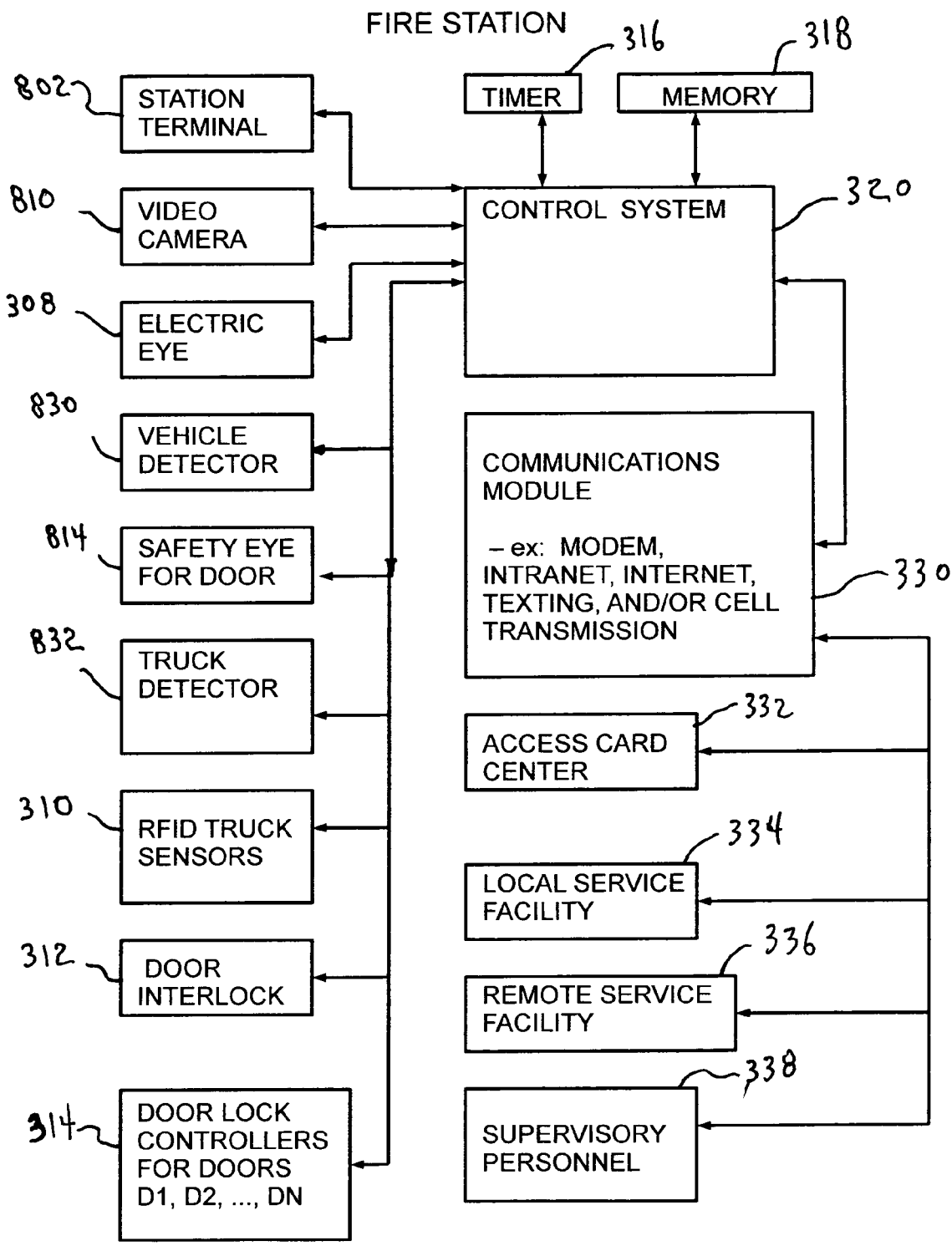
FIG. 15 is a schematic diagram of connections of elements usable in the fire station dock which is shown in FIG. 14 integrated into a control and management system.

The number of doors and number of cameras can vary, from a single door to many doors, and the number of cameras from a single camera observing a single area or door, to many cameras observing many doors and entrances. It will be understood that the depiction of sensors and other devices in FIG. 14 is merely representative and not exhaustive; FIG. 15 illustrates further such devices by way of further example.

The system shown in FIGS. 14 and 15 enables a remote manager to monitor a number of different fire stations, so that readiness can be directly observed when summoning vehicles to a fire or other emergency. Additionally, the system allows monitoring to prevent or deter vandalism and theft, and if such vandalism or theft occurs then the system enables retrieval of full information relating to the event(s) which surround the vandalism or theft, so that appropriate measures can be taken by law enforcement to find responsible parties and to retrieve stolen equipment. The control system 320 is capable of sending email and/or text message alerts to management or other security officers, upon detection of specific events such as door left open, fire alarm active, smoke detector alert active, and so on.

FIG. 15 is a schematic diagram of connections of elements usable in the fire station 800 of FIG. 14, integrated into a control and management system. FIG. 15 shows a control system 320 and a communications module 330 which are in communication with each other. The communications module 330 can additionally communicate with an access card center 332, a local service facility 334, a remote service facility 336, and supervisory personnel 338. The communications module 330 can communicate in any known manner including by modem, internet, intranet, microwaves, laser, and cell transmission among others.

It will be understood that the communications module 330 may communicate with other services or locations than those shown, and can include fewer than those shown. The control system 320 and the communications module 330 are similar in purpose and function to those shown hereinabove with regard to FIGS. 1-11, and are not further described herein. The control system 320 communicates with a timer 316 and a memory 318 in known fashion.

The control system 320 additionally communicates with the station terminal 802, the video camera 810, the truck detector 832 (and the detector 834), the vehicle detector 830, RFID truck sensors 310, a door interlock 312, door lock controllers 314 for all doors (shown in FIG. 15 as doors D1, D2, . . . , DN), and a safety eye 814 for the main door. The electric eye 308 is used for sensing objects near the main door 812. All of these work individually in a fashion known in the fire station arts, and operation of these can be used as signals for an event within the meaning of the management control system according to the present invention. Additionally, such event causes recordation of the state of all of the devices connected with the control system.

Which single devices may be indicated in FIG. 15 connected to the control system 320, it will be understood that a plurality of such devices can be connected thereto. For example, the video camera 810 can represent a plurality of such video cameras. Within the control system 320, any of the cameras may optionally also pan, tilt, and/or move, as described hereinabove.

For the fire station of FIGS. 14 and 15, various installation and maintenance issues are addressed as follows. Currently station doors can be controlled at the door or in the station operations center where each door might require four wires to accommodate the open and close commands and additional wiring for truck presence indicators (usually a indicator light) and door open indicator. Typically, this takes a minimum of eight wires. Multiply this number by a typical 8 bay station and the result is 64 wires and banks of buttons. However, the IP networked door controllers in accordance with the present invention would allow a single data wire and a simple computer screen the ability to manage and operate the multiple doors saving thousands in installation costs, pounds of copper, steel and valuable control room real estate.

The system of the present invention, including all of the embodiments shown in FIGS. 12, 13, 14, and 5, includes electrically operated door and or locks, IP door controllers with event generation capability, integrated access control, cameras, and a network that is either local Ethernet® or internet with server, server program with parser and user secure login access. The system of the present invention captures all on/off signals of all devices including motion detectors, loop detectors, electric eyes, access readers, door not closed sensors, door motor overload switches, safety eyes, safety edges, carbon monoxide detectors, heat and smoke detectors, motion detectors, etc. and generates an event log that is examined by the station operation program for anomalies and parsed into a database for report generation, immediate operational alerts event reconstruction Advantages Some advantages of the present invention are summarized below:

1. System sends e-mail or text message alert if anomaly is detected such as door left open.
2. System tracks presence of personal and equipment.
3. System holds time stamped event data to reconstruct events such as vehicle door impacts allowing for meaningful system redesign or training to occur.
4. System allows remote viewing, access, operation and diagnostics via IP cameras and IP door controllers.
5. Event data mining allows for operational cost analysis of comparable systems to be evaluated over time.
6. System allows for centralized security office to be established that oversees multiple stations from a single location.

Referring to the third example mentioned in the Background of the Invention relating to piecemeal solutions used in the prior art for fire stations, by the present invention shown in FIGS. 14 and 15, a camera system is advantageously provided and used, and integrated into a system, such that it is controlled by or activated during events such as the station door being "not closed" and "safety eye activated" and would generate data only when an intrusion event is actually occurring. This information is provided by the present invention as information related to the specific event in question.

In addition, the present invention as shown in FIGS. 14 and 15 provides a system that immediately e-mails and/or text messages a concerned participant such as the station manager or supervisory personnel, when specified types of events occur.

Referring to the fourth example noted hereinabove of a need in the prior art, it is noted that in FIGS. 14 and 15 a safety loop that holds the bay door open against its timeout can by the present invention be integrated into a vehicle presence detector, and optionally can also use RFID technology that would be able to determine that a particular piece of equipment is "home" and ready for dispatch; and all this information is associated with individual recorded events.

Referring to the fifth example of a need in the prior art, by the present invention as shown in FIGS. 14 and 15, a camera that is constantly recording will by the present invention allow individual frames to be associated with specific events. If integrated into the door controller, the camera would capture door vehicle impacts as noted in one or more of this inventor's previous patent applications and patents identified hereinabove, and can also work to detect intruders in combination with the safety eye activation. The same camera integrated into the station operation platform according to the present invention would also enable remote verification that a piece of equipment is "home" and ready for use, would capture intruder events, and allow remote operation of door equipment on camera which would allow safe overriding of safety controls as is specified in UL specifications. Further, station bay doors typically can open on individual ceiling pull command, by push button station either at the door or at the station manager desk and or on "alarm" and by the present invention these events are recorded and associated with other available information for retrieval later in a convenient and readily accessible form. Likewise, the doors will then often close on timer command after the fire vehicle has exited, and not uncommon is the circumstance where the safety eye is blocked, safety loop malfunctions or other event occurs where the door fails to close which leaves the station open and venerable to theft and vandalism. In the present invention all of this information is available readily and conveniently associated together by recorded events.

An example of an apparatus and system related to the foregoing and which can be used in the present invention is a commercial embodiment which is known as SmartDoor System model SDS-0400IP™ iPortal™ Manager, and which in combination with the teachings of the present invention addresses the concerns of parking managers, parking attendants, overhead door service technicians, emergency fire and rescue, parking patrons, shipping clerks, building engineers, building owners, building managers and security officers. Each activity that occurs in the portal area is broken down into its individual components and then parsed into a data base where it can be reconstructed in report form so as to address the individual concerns of the designated area practitioners noted above. The above-noted SDS-0400IP™ iPortal™ Manager also is designed to switch into different operational formats in direct response to commands or circumstances as sensed by its network of sensors and its program. In the event of multiple signals or commands for simultaneous different run characteristics, the system responds based on a hierarchy determined by its program. This is standard "state machine" technology that is well understood by developers and programmers dealing in the art of motion control.

Figure 16:
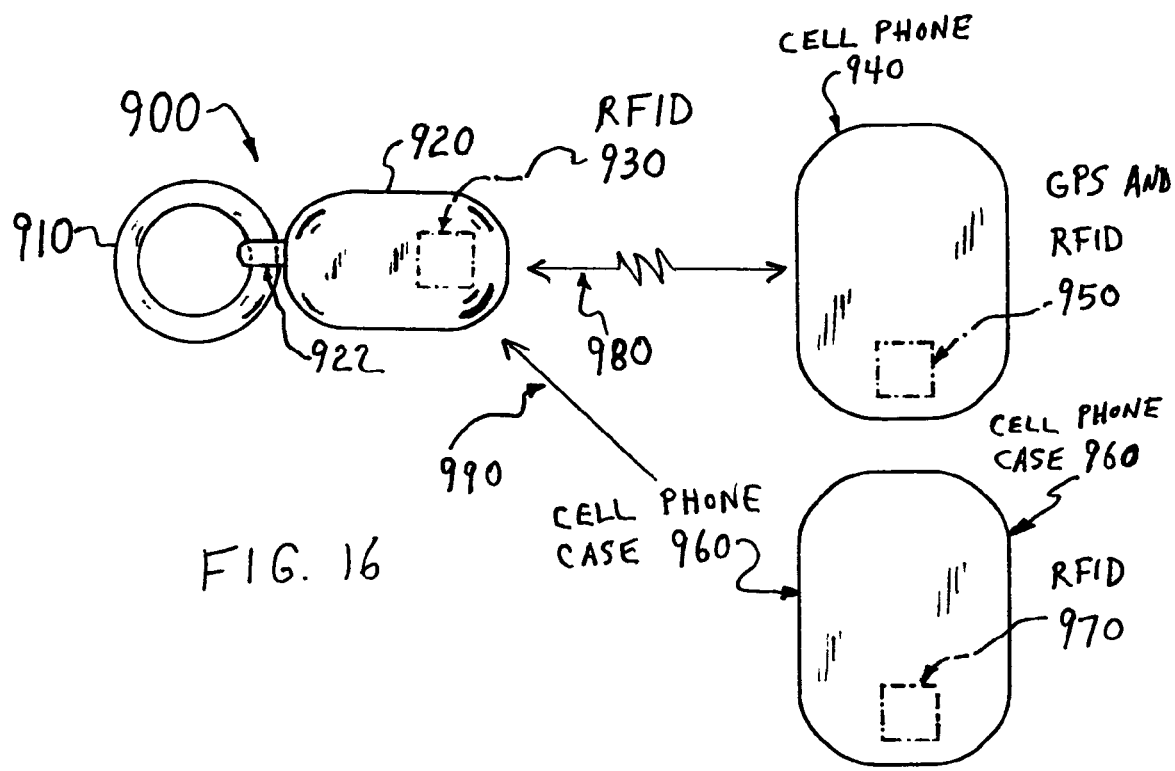
FIG. 16 is a schematic diagram of a transmitter and receiver for locating a cell phone using a device carried by a user.

FIG. 16 is a schematic diagram of a transmitter and receiver for locating a cell phone 940 using a device carried by a user. The cell phone 940 preferably has a GPS location device or circuitry 950 for determining the location of the cell phone. A cell phone case 960 can likewise be provided with RFID circuitry 970, allowing a RFID circuit 930 carried remotely in a casing 920 on a keychain 900 having a key ring 910. Signals 980 between the cell phone 940 and the keychain device 930, or signals 990 between the cell phone case 960 and the keychain device 930, allow detection of a missing cell phone and/or cell phone case.

In the figure shown, the GPS detection circuitry is schematically shown as contained in the circuitry 950 along with RFID circuitry. Such cell phone devices are not currently known to be available with RFID circuitry, but this can be incorporated during manufacture in a known manner. The cell phone of FIG. 16 is exemplary, and includes picture-taking abilities; in the following there is no need for either the GPS circuitry or the RFID technology, which are not necessary to the present invention shown in FIGS. 17 and 18. Since this invention greatly enhances the use of a cellphone, losing or misplacing it can greatly affect operational efficiencies.

FIG. 17 is a schematic diagram of a plurality of locations L1, L2, ..., L(N-1), LN which are to be visited by a guard GG following a path indicated in dashed lines in FIG. 17. The guard GG verifies locations that are visited by using the cell phone camera 940 to take pictures of QR barcodes C1, C2, ..., C(N-1), CN which are disposed at the various locations L1, L2, ..., L(N-1), LN for verification and documentation purposes. The QR code is adapted to be used by the Google™ Android™ operating system for decoding and transmitting QR code data captured by use with the included cell phone camera, as explained in detail in the Wikipedia listing for QR codes.

According to Wikipedia, a QR code is a specific matrix barcode, or two dimensional code. The term QR stands for quick response, and it is readable by QR bar code readers and camera phones. The QR code is composed of black modules arranged in a square pattern on a white background. The information it contains can include text, URL codes, and other data.

Here, while a guard GG is shown, the path followed could instead be, for example, a delivery person, repair person, installation person, a sales person, or other service person making their rounds at a plurality of locations, and/or servicing various equipment, and which may or may not follow a predetermined path. In this instance, the capture of the QR codes C1, CN allows capture of location data, which are combined with a time stamp from the cell phone 940 as well as GPS (if provided with the cell phone 940) and transmitted by the cell phone to a predetermined location or person. Advantageously, if the QR codes correspond to unique locations, then the GPS feature is not necessary and can be omitted from the cell phone 940.

The cell phone data, which as noted above includes time stamp data, QR code data, and possibly location data, is used by the system of FIG. 4 as described further hereunder with reference to FIG. 19.

FIG. 18 is a schematic diagram of a QR code 972 being scanned by a cell phone 940 having a camera. The cell phone camera, having a field of view FOV, is used by a guard GG as in FIG. 17, for scanning the QR code 972. The QR code 972 corresponds to one of the QR codes of FIG. 17, namely the QR codes C1, C2, ..., CN. As noted above, the software of the cell phone 940 is capable of decoding the QR code data, and uploading that data along with time stamp data, to a central receiver or supervisory personnel via text message, voice message, or data transfer.

FIG. 19 is a block diagram showing the cell phone 940 having a cell phone app (as described above) for decoding the QR codes using the camera carried by the cell phone 940. As shown in this figures, the cell phone 940 transmits a signal 55 indicating the time stamp, the QR code, and also includes the location data if the cell phone 940 has a GPS capability. The signal 55 is received ultimately by the modem 54.

Thus, FIG. 19 shows how the cell phone 940 of FIGS. 17 and 18 interacts with the control center 40 and modem 54 of FIG. 4, to send signals indicating the QR code and location. Here, the modem 54 is shown in its modern interpretation, as including a modem/internet/email/cell capability, all of which variations are intended as being encompassed by the generic term modem. The APP or application can include data cells for entering any information deemed necessary for the successful and transparent operation of the system.

The control center 40 stores the data received from the cell phone 940 in the memory 52 database as data. The data stored in the memory 52 can be used as described hereinabove, to associate data corresponding to specific events, including any data received from disparate sources, to form a convenient and readily accessible way for a manager or supervisory personnel to examine specific events such as service events on QR coded equipment, security inspection point events, or any information gathering events that are with the capabilities of this technology.

Here, the specific information generated by the operation of FIGS. 17, 18 and 19 could be used for determining location of a guard during a specific time, to track maintenance on equipment, and service calls, among many other types of activities which could be monitored in a task tracking system.

OR Codes—Cashless and Paperless Parking System

The aforementioned use of QR codes in FIGS. 17-19 also has application in the above-described parking management system of FIGS. 1-11, the loading dock management system of FIGS. 12 and 13, and the fire station management system of FIGS. 14 and 15.

Background:

Current parking technology requires cash, monthly account access cards or credit cards for payment.

In addition there exist different types of parking facilities: self-park, auto-park elevator systems and valet parking. Within the facilities there are single space, stacked space and elevated space parking types. And, facilities can be automated with traffic gates or manually operated with attendants.

The size of the facility and its primary use is another factor. A facility primarily used for a sporting event would have very high peak flow requirement as might a factory shift facility or a government office facility where traffic peaks at defined times. Whereas a facility used at a shopping mall might peak only at Christmas.

It is the joint decision and goal of the parking professionals to design and manage a particular facility in such a way as to generate the most revenue with the least cost and expense and at the same time meet and satisfy customer expectations.

Various technologies have evolved to facilitate the goal of the professionals and these technologies continue to evolve. The evolution is driven by the technologies and the limitations that are revealed in their application.

Lost revenue in its various aspects from lost customers due to poor performance by facility operators; employee theft of cash; high prices driven by operational overhead costs and the state of the local economy all affect the operator's bottom line.

The concerns for cost effective inventory management, security, access/egress identification, payment and traffic flow underpin the decision making of the facility operators taking into account the overall activity of the facility and the available technologies as described above. Any useful innovation would need to affect in a positive way some aspect or aspects of facility operations.

This inventor's previous patents and applications have touched on various aspects of the parking management conundrum and all of those documents are hereby expressly included by reference herein.

The focus of this invention relates to access, payment security, identification, and inventory management. The aforementioned QR codes offer a unique way to address various aspects of the parking conundrum and the method of application can be seen in the following manner.

Payment security—Cash payment offers many opportunities for employee theft and continues to be a problem that plagues the industry. The previous application by this inventor, U.S. Ser. No. 12/930,437 filed on Jan. 6, 2011 and expressly incorporated herein by reference thereto, refers to a ticket tracking system that attempts to improve payment security. Credit and debit card payment systems and monthly account card holders remove some but not all cash from the parking experience. A drawback in these systems is the cost of the equipment, the money lost in transaction fees and the real estate the transaction machines require. This technology works well with automated traffic gates and barriers. However, it is less useful in the manually operated facilities where the parking layout or the size if the facility make automation impractical.

The proliferation of cell phones and the additions of scanners and readers built into the camera function offer unique access and payment functionality for parking facilities. Three technologies combined make the system as envisioned:

1. An on line parking account tied to the parking company account.
2. The cell phone scanner with QR or bar code scanning capability.
3. An App.
4. A transaction acknowledgement device such as a PC with a LCD display.
5. A QR code unique to the parking facility.
6. An internet connection that connects the phone APP, the persons parking account, the parking company account and the LCD display.
7. An application on a server that connects all the above.
8. A traffic gate or attendant.

An enhancement might be an "internet hot spot" in the parking foyer. This can be included for use in the present invention.

Operation:

In operation, the parking patron would activate their parking APP and scan the QR code at the entrance. The cell phone would access the parking application on the server and verify account status and entry authorization if a secure facility or for available space. If allowed, the patron would enter the facility in access mode by the opening of a traffic gate and a timestamp of the access event would appear on the LCD. If the facility was a manual or valet facility, the attendant would motion the person to enter and hand them a multipart ticket (for example), after which the attendant would take the car to a parking location. An enhanced version would have the multipart ticket stamped with the event transaction number on each of its parts, so that one part of the ticket is left on the windshield, one part of the ticket is left on the keyboard, and one part of the ticket is given to the patron. The parking APP could include an address and Google® maps connection so the patron could easily find his way back to his parking location or e-mail the location to someone who is tasked to retrieve the vehicle such as a spouse or car rental agency.

There are two possible exit scenarios: prepayment at entry, and pay at exit. In either case, the system can pre-verify that sufficient funds are in the account and a quick scan on exit would complete the transaction. Since the system would already have a prepayment approval, the exit transaction would be very fast unlike credit card transactions which are rarely used because they hinder traffic.

The following benefits can be expected over the current art:

1. The patron would benefit by not needing cash and this system would make expense reporting easier. The patron could have a Google® maps connection to his vehicle or a location map that could be easily e-mailed to someone for vehicle pickup.
2. The payment transaction would be faster than cash or credit; a critical factor in high traffic facilities.
3. The expensive pay stations with paper tickets could be eliminated or reduced in number.
4. More cash would be removed from the hands of attendants even in "manual" facilities removing the inevitable temptations.

Figure 20:
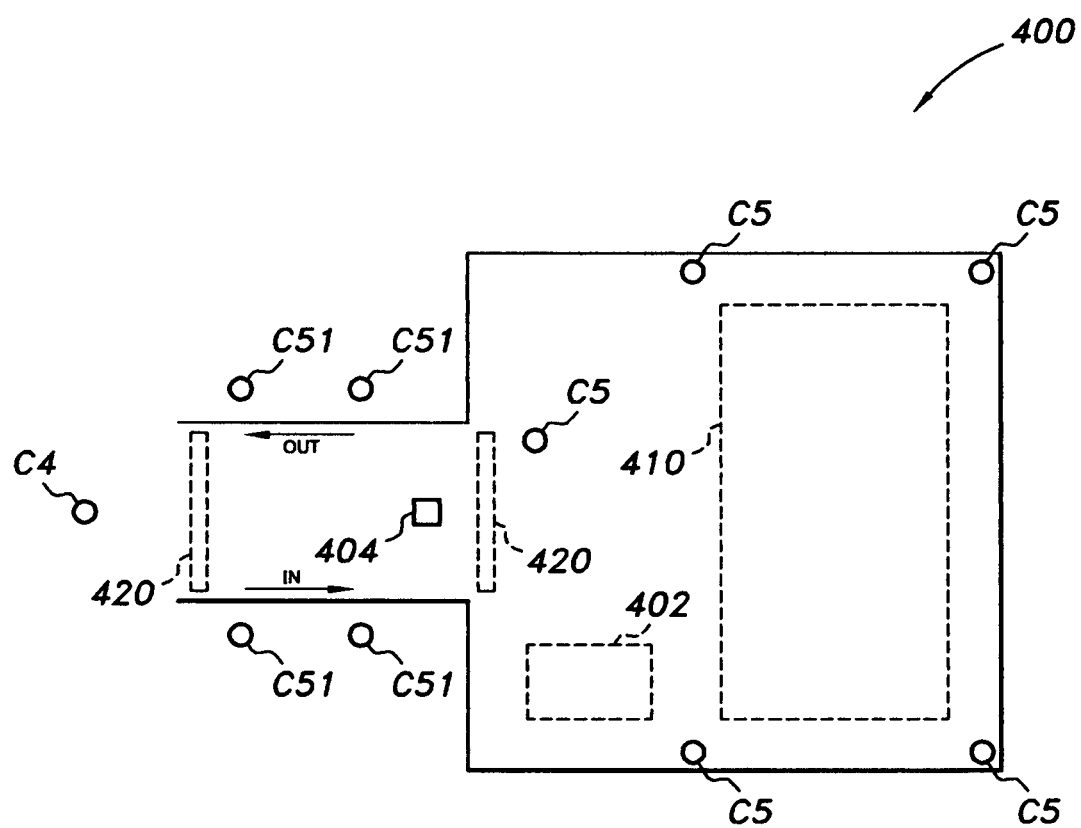
FIG. 20 is a schematic diagram of a rental car facility, showing an office, parking section, and entry/exit lanes, and cameras.

FIG. 20 is a schematic diagram of a rental car facility 400, showing an office 402, a parking section 410 for parking rental vehicles, entry/exit lanes marked IN and OUT, an overhead camera C4 which is also disposed to capture high resolution images of license plates, a plurality of security cameras C5 disposed around the rental car facility 400, and a plurality of cameras C51 disposed on sides of the entry/exit lanes. At least one set of barriers 420 is required to control entry and egress from the facility 400; two possible locations of such barriers 420 are shown, and it is possible to have two separate locations for the barriers 420 to use one for entry and the other for egress from the facility 400.

Additionally, other types of sensors, input devices, and communications systems can be provided as shown and described hereinabove with reference to FIGS. 1-19. All such systems and devices are integrated into a system as described hereinabove and also with reference to FIG. 21 below, and an example of an apparatus and system related to the foregoing and which can be used in the present invention is the above-described commercial embodiment which is known as the SmartDoor System model SDS-0400IP™ iPortal™ Manager.

Figure 21:
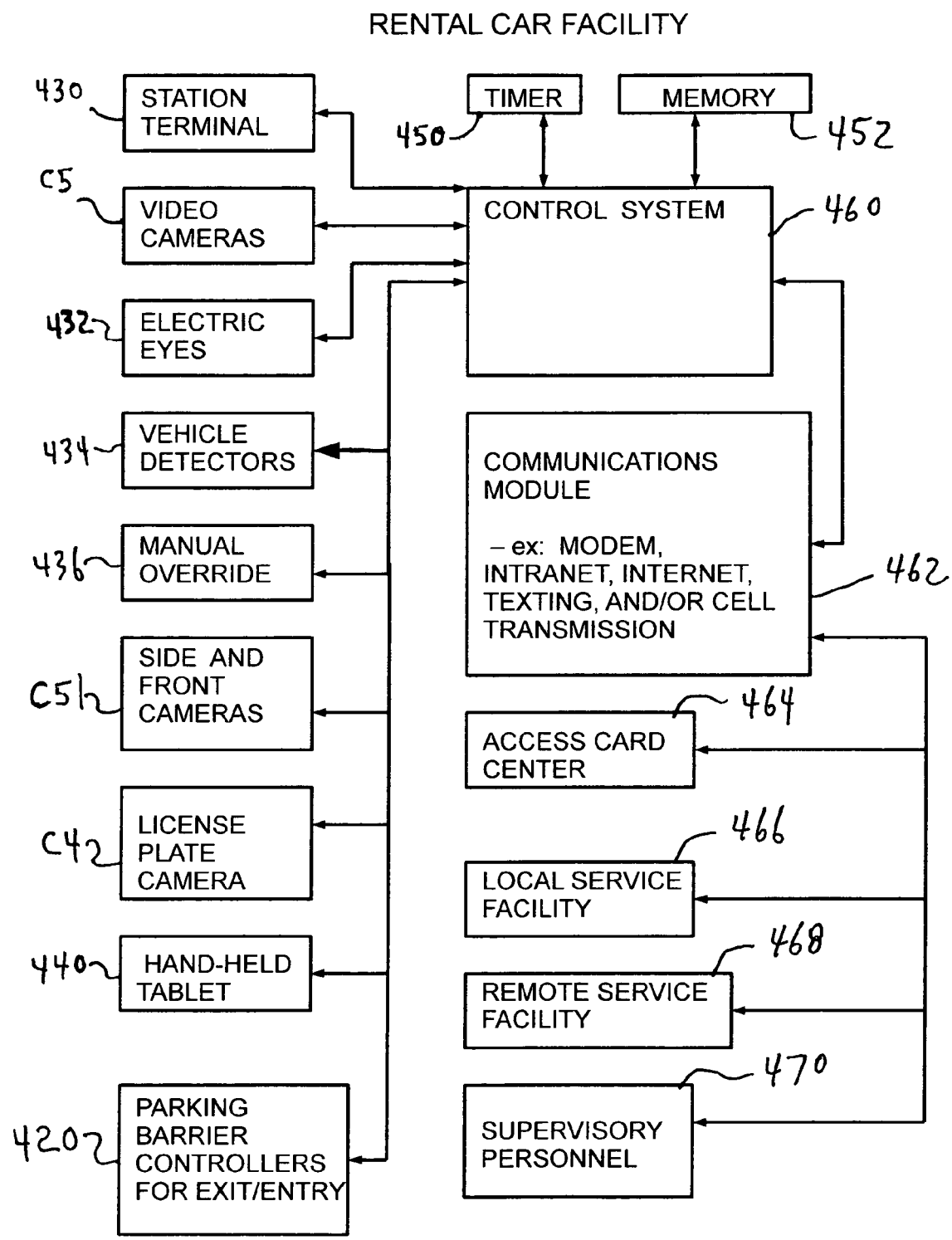
FIG. 21 is a schematic diagram of connections of elements usable in the rental car facility which is shown in FIG. 20 integrated into a control and management system.

FIG. 21 is a schematic diagram of connections of elements usable in the rental car facility 400 which is shown in FIG. 20 integrated into a control and management system.

FIG. 21 shows a station terminal 430, video cameras C5, electric eyes 432, vehicle detectors 434, a manual override 436, side and front cameras C51, a license plate camera C4, an optional portable hand-held tablet input device 440 for rental facility attendants to use as they move about the facility 400, parking barrier controllers 420 for exit/entry control. All these are in communication with a control system 460, which is also in communication with a timer 450, a memory 452, and a communications module 462 which can communicate by email, text, modem, intranet, and/or cell transmission. The communications module 462 is in communication with one or more of an access card center 464, a local service facility 466, a remote service facility 468, and supervisory personnel 470. The operation of the system of FIGS. 20 and 21 is described further hereunder. While a rental car facility is described, it will be understood that the present invention is applicable to other types of rental facilities for vehicles, such as truck rental facilities, construction equipment rental facilities, boat and watercraft rental facilities, etc.

The controlled exit system for a rental car facility according to the present invention solves the aforementioned breakdowns in existing systems by adding accountability, data logging, equipment monitoring, and communication to a system that typically lacks all of these.

The controlled exit system envisioned by the present invention comprises: one or more high resolution cameras (IP or similar), the model SDS-0400IP™ iPortal Manager™, the gate/barrier system, and the sensors and control inherent to the gate/barrier system and a broadband connection to the internet and system server.

The present invention allows for car rental businesses to shift more vehicle damage costs to renters using the times-tamped, search-able data logs with high resolution attached images to more accurately assess the condition of the car as it exited, which can then be compared to the returned condition. A hand-held tablet computer with WiFi connection to the custom server software can instantly bring up high resolution video of car leaving the lot, making it easy to see what condition the car was in as it left the lot. This would eliminate the renter from arguing about when the damage occurred. A second set of cameras installed at the entrance to the lot would record the condition as the car was returned, eliminating human error or inattention from the process. This benefits the customer's peace of mind regarding scratch and dent scams. The rental company benefits from have verifiable proof of any damages done to the car.

The system also monitors, controls, and notifies appropriate personnel of any breakdowns, failures, or tampering of the barrier and sensor system, in real-time via electronic communication, text message, email, SMS, or through a sounder, light or buzzer controlled by the model SDS-0400IP™ iPortal™ Manager. Logs of sensor activations, along with the photo records, simplifies troubleshooting of problem, including intermittent failures normally requiring multiple costly service calls to repair technicians. Such diagnostics can help onsite personnel repair simple problem themselves, reducing security-compromising downtime.

Through signal monitoring and analysis, the model SDS-0400IP™ iPortal™ Manager detects and notifies if more than one vehicle exits during a let-out, eliminating vehicles from being "waved through" or otherwise leave the lot without proper verification. A vehicle sensed that exits without any verification instantly notifies the manager, security, and/or other appropriate personnel. Eyewitness report are notoriously unreliable, existing CCTV systems unwieldy and slow to use, typically also very poor quality, increasing the time to gather license plate number, vehicle description, and driver descriptions to give to law enforcement to recover the vehicle. In these situations time is a critical factor, and with the Smart-Door System model SDS-0400IP™ iPortal™ Manager and management system of the present invention a manager can have high quality pictures of the car and driver in his email in-box before reports of the theft make it to him from the other personnel. This added, high quality, timely information should prove invaluable to the speedy recovery and prosecution of thefts.

This system also allows for verified, timestamped, photographed, contract linked unmanned let-out, reducing staffing needs and cost, especially during off hours. Entering a contract number into the device initiates a let out procedure which can be either fully automated, or verified and egress granted by an agent located at the rental counter or office.

Implementation of the Rental Car Facility Management System:

Upon entering the gate exit area, a loop, motion, or other vehicle sensor signals to the model SDS-0400IP™ iPortal™ Manager that a car is present. The controller communicates through LAN, serial or direct control to the camera or cameras to begin capturing images at a predetermined frame rate. This can continue until the sensor indicates that the car is no longer present, or alternatively can continue for a predetermined period of time.

Manned Locations:

A car rental agent would enter contract number into the model SDS-0400IP™ iPortal™ Manager via touchscreen display or other terminal, reader, barcode scanner or other connected input device connected to the database through the LAN or internet. This ties the expected let out event to the rental contract, and to the set of pictures, timestamped and available for review. In a preferred embodiment, the database would be on an internet based server with its associated database application. The server would be notified of the impending letout event when the contract is opened on the server. The decision to letout would be local to the gate, allowing for speedier exits.

The car rental agent then selects the type of let-out from a list: rental, delivery, contractor, vehicle maintenance, personal car, etc. This creates a search-able log of all exit events, search-able by time, type, contract number.

After data is entered, the model SDS-0400IP™ iPortal™ Manager opens the barrier system, continuing to record until the vehicle has cleared the gate and the gate has returned to the secure position.

Through the complete monitoring of sensor signals, the model SDS-0400IP™ iPortal™ Manager can determine if more than one vehicle has exited, triggering notification.

Equipment breakdowns or signal anomalies are detected and notifications sent, reducing damages to vehicles and equipment.

Through automatic signal analysis, the model SDS-0400IP™ iPortal™ Manager can detect multiple types of faults, notify as needed, and disable equipment until repaired.

Manual control is possible in some fault conditions to allow equipment to be run with sensor faults. This is not the case with current control designs.

Un-Manned Exit:

A renter enters a contract number on a touchscreen of the model SDS-0400IP™ iPortal™ Manager or uses another connected input device. An agent at a second terminal remotely located verifies the contract number and initiates let-out as in manned exit, and can view high resolution video feed as the renter exits to verify the process.

Non-renters can be let out by same process, by entering for instance a "0" to initiate the process Alternative Entry/Exit Method:

Permission to exit is granted at a rental office counter by a terminal that will generate a code using the let-out algorithm. This code can be set to be valid for a set amount of time and good for a single use. The code can be linked to the contract number, allowing for the same search-able, verified data as described above.

An entry lane or lanes preferably includes a terminal, touchscreen, card reader, bar-code scanner or similar data entry device, at least two cameras mounted such that as the car drives through, all sides are recorded, and a vehicle presence device. The renter would enter or scan an identifying contract number, a frequent renter card, or other unique identifier as was used to exit the facility originally. The server software would link the entering and exiting photo records together, timestamped, and linked to the renter.

Residential Event Recording System:

The capture of recurrent activity in residential settings mimics commercial activity, just on a less frequent schedule. For instance, the portal opening on a house, i.e. the front door, garage door, back door, etc., only differs from a commercial application in the volume of the persons entering and leaving and the stakeholders for the space may be consolidated. A parent might wish to see, with a door open and close event, information that includes video or pictures of who comes into the house, when children come home from school or who comes into the house when the parents are away. A traveling businessman or woman might wish to see who comes into the house when they are away. In each case, a system as described that includes one or more cameras, portal(s) (swing door, garage door, driveway gate, etc.), ajar monitor switches or other indicators of activity such as magnetic sensors, loop detectors, motion detectors, electric eyes, and the event recording data storage and retrieval application of the present invention would create a system for this. In a broader application, a system that captured smoke alarm, water alarm, carbon dioxide alarm, and run times for heat and ac systems would all contribute to an identification of recurrent activities that can be gathered into a database and mined through an application for information that is useful to service technicians, security personnel and operational managers. In the current case example, the homeowner might be the "user" in each domain.

Figure 22:
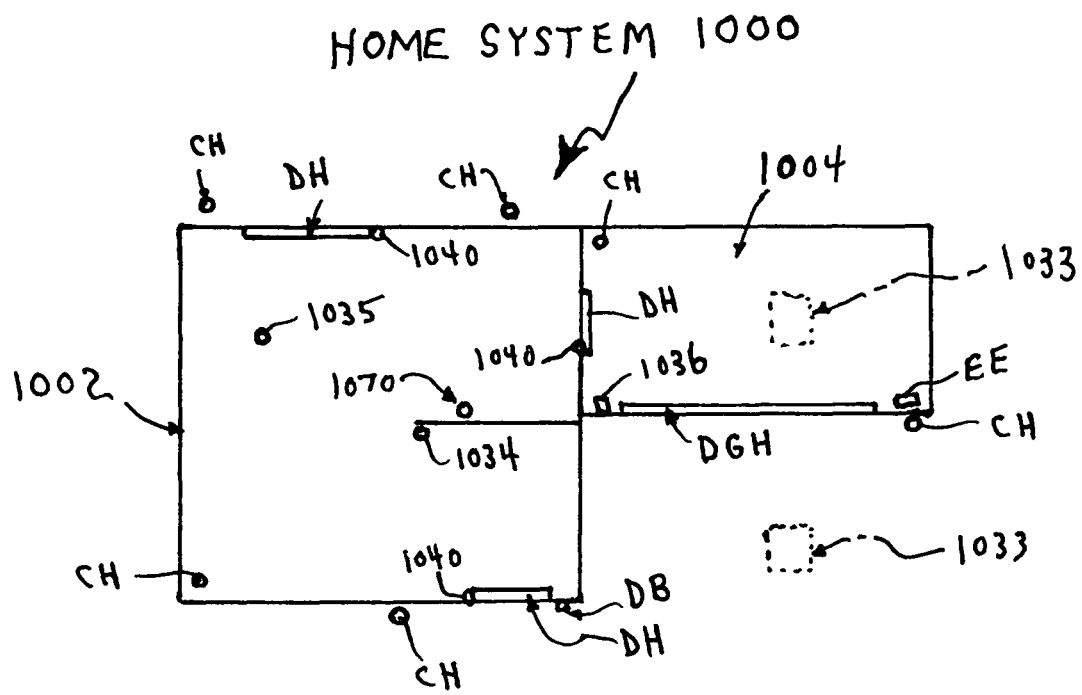
FIG. 22 is a schematic overhead diagram of a home system, showing a house portion and a garage portion.

FIG. 22 is a schematic overhead diagram of a home system 1000, showing a house portion 1002, a garage portion 1004, a smoke alarm 1034, a carbon monoxide alarm 1035, buried vehicle detectors 1033, 1033 to sense the presence of vehicles in the garage and also in the driveway, a plurality of doors DH at the front and rear of the house and one connecting the house to the garage.

FIG. 22 also shows an electric eye EE, a doorbell DB, and a thermostat 1070. A plurality of door sensors 1040 detect the open/closed condition of various ones of the doors, and preferably all of the doors. A plurality of cameras are mounted to observe the exterior and interior portions of the house and garage, and especially to monitor persons and vehicles approaching the front door, garage, and rear door. Alternately a camera could be incorporated directly into the homeowner's garage door operator.

Additionally, other types of sensors, input devices, and communications systems can be provided as shown and described hereinabove with reference to FIGS. 1-21. All such systems and devices are integrated into a system as described hereinabove and also with reference to FIG. 23 below, and an example of an apparatus and system related to the foregoing and which can be used in the present invention is the above-described commercial embodiment which is known as the SmartDoor System model SDS-0400IP™ iPortal™ Manager.

Figure 23:
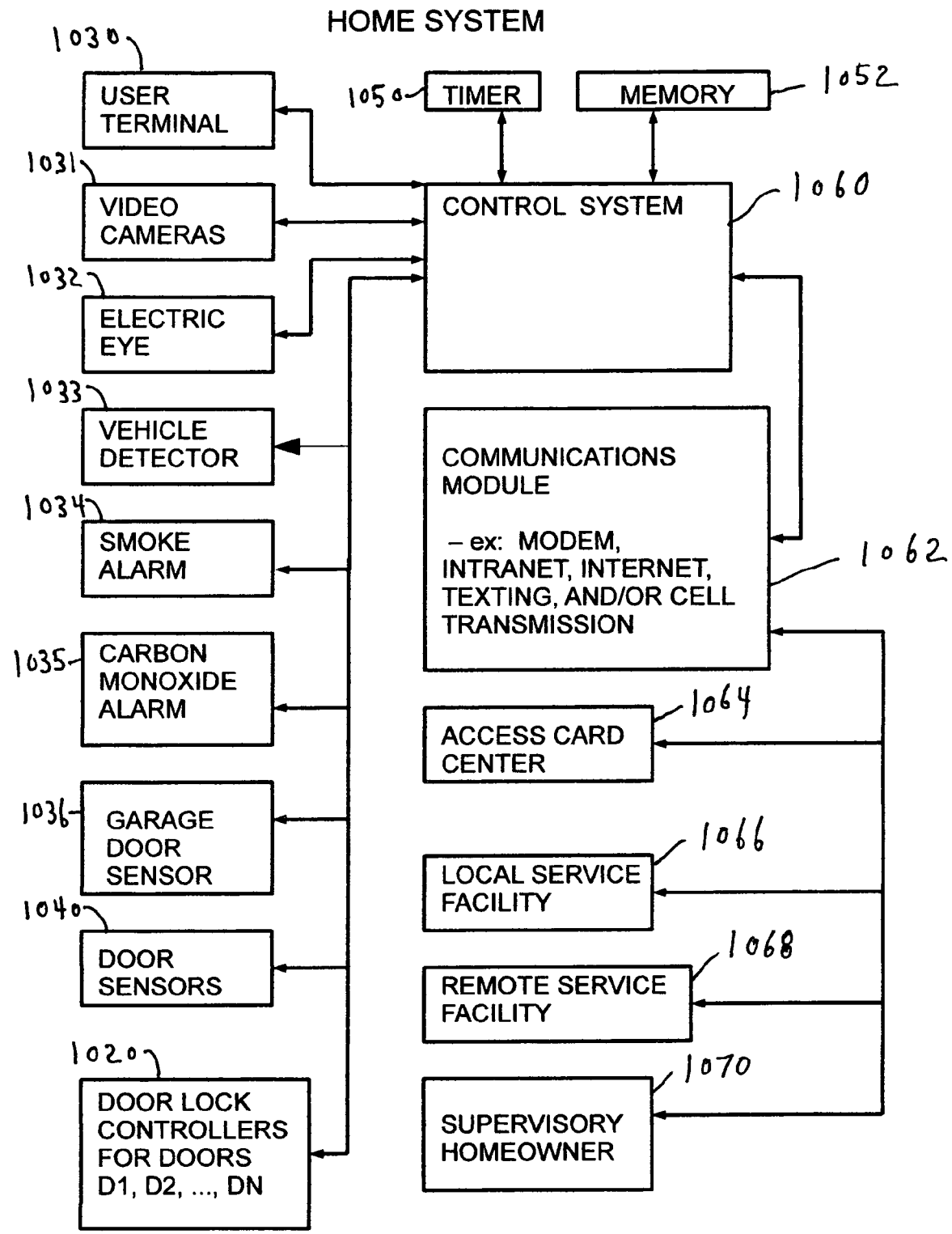
FIG. 23 is a schematic diagram of connections of elements usable in the home system which is shown in FIG. 22 integrated into a control and management system.

FIG. 23 is a schematic diagram of connections of elements usable in the home system 1000 which is shown in FIG. 22 integrated into a control and management system. FIG. 23 shows a user terminal 430 which can optionally be placed at any of the doors to grant access, for example to delivery or service personnel, visiting relatives and friends, etc. FIG. 23 also shows video cameras 1031, an electric eye 1032, vehicle detectors 1033, a smoke alarm 1034, a carbon monoxide alarm 1035, a garage door sensor 1036, door sensors 1040, and door lock controllers 1020. Radio Transmitters commonly called FOBS, keypad devices, and ordinary keys also commonly grant access to the house portal entrance and can be used in the present invention.

All or some of these are in communication with a control system 1060 which includes a door open sensor, presence sensor or motion detector (not shown in FIG. 23), which is also in communication with a timer 1050, a memory 1052, and a communications module 1062 which can communicate by email, text, modem, intranet, and/or cell transmission. The communications module 1062 is in communication with one or more of an access card center 1064, a local service facility 1066, a remote service facility 1068, and one or more supervisory homeowners (or other supervising authority such as a house sitter) 1070. The operation of the system of FIGS. 21 and 22 is described further hereunder.

The home management system of the present invention allows for controlled entry/exit for delivery and service persons, visitors such as friends and relatives, etc. It also monitors events such as entry/exit, door openings, vehicle detections, smoke and carbon monoxide detection, and so on. All of these events are associated with the relevant sensory data and images, and events can be remotely monitored by the homeowner (for example), and texts/email alerts can be sent upon occurrence of predetermined conditions (alarms, door open too long, thermostat too high or too low, etc).

The controlled entry/exit system envisioned by the present invention comprises: one or more high resolution cameras (IP or similar), the model SDS-0400IP™ iPortal™ Manager, the gate/barrier system, and the sensors and control inherent to the gate/barrier system and a broadband connection to the internet and system server with its data collection, storage and data retrieval application.

Further Example of Use with a Parking Management System

In a prior application, noted hereinabove, there is disclosed an inventory tracking system involving a parking management system that ultimately reconciles four currently disparate (different) data bases with a newly generated data base into a unified audit system.

The databases are summarized briefly as follows:
1. Closing inventory monthly and transients.
2. Monthly account holders
3. Opening inventory monthly and transients.
4. Overnight activity including monthly, transient (transient being daily pay patrons) and "others" to include tailgaters, building employees, etc., from the letout logs, and monthly account holders' activity logs and image recordings.

The event parsing and reconciliation process of these databases on the server creates the possibility for audited reports of actual activity and ensures honest inventory accounting by the parking attendants.

In the existing prior art systems, the opening and closing inventory reports are generated on paper logs and sometimes days later uploaded into auditing software along with the ticket information to reconcile tickets and cash. However, it is contemplated that the SmartDoor System model SDS-0400™, iPortal™ Manager referred to hereinabove can be used to generate the opening and closing inventory report in a manner similar to that shown in FIGS. 17-19 above. That is, the opening and closing inventory report could be generated on an APP (application) on a cell phone, notebook computer such as an iPad®, etc., as the attendant walked through the garage. Such an APP could be made by any one having skill in the cellphone APP programming arts, given the requirements set forth herein.

The aforementioned attendant could take down license plate numbers or even take pictures of the plates and enter in ticket numbers from windshield ticket stubs or monthly account holder's ID tag numbers. The APP would then upload the information to the server to be parsed into the database via email or hot spot Wi-Fi data link. A QR code (described hereinabove) on the ticket stub could preferably include ticket number and location information allowing quick and efficient scans of current inventory making the effort even more transparent.

The invention being thus described, it will be evident that the same may be varied in many ways. Such variations are not to be regarded as a departure from the spirit and scope of the invention and all such modifications are intended to be included within the scope of the claims.

What is claimed is:

1. A management system for a loading dock facility, comprising:
   a computer;
   a database in communication with said computer;
   a task tracking means in communication with said database;
   an access management means in communication with said database, for supplying event information to said database;
   a vehicle detecting means in communication with said database, for supplying event information to said database; and
   an alert means in communication with said database, using said event information;
   an inventory tracking means in communication with said database, for supplying event information to said database;
   wherein said inventory tracking means further comprises a camera in communication with said computer, said camera being located to provide images of entry and egress of vehicles at a portal of the loading dock facility and to provide images of packages unloaded or loaded into a truck parked at the loading dock;
   wherein said alert means further comprises software operated by said computer to associate event IDs with event activities and images captured at the time of the event;
   whereby said computer uses the event information supplied to said database to compile an event library which is configured to generate alerts, compile reports, and control access to and egress from the facility.

2. A management system for a facility as claimed in claim 1, further comprising a network providing communication with said database and with said computer.

3. A management system for a facility as claimed in claim 1, wherein said task tracking means includes a package scanner for reading package information.

4. A management system for a facility as claimed in claim 3, further comprising an event monitor for recording an event which includes the reading of the employee ID together with the entering of the task information into the ID reader.

5. A management system for a facility as claimed in claim 1, wherein said access management means further comprises a readable device which carries permission information to permit a person to access the facility, and an apparatus for reading said readable device.

6. A management system for a facility as claimed in claim 5, further comprising a local database in communication with said apparatus for reading, wherein said local database carries information relating to permission to use the facility by a patron using said readable device.

7. A method for managing a facility which has controlled access for vehicles, comprising the steps of:
   providing a computer;
   providing a database in communication with said computer;
   providing a task tracking means in communication with said database;
   providing an access management means in communication with said database, for supplying event information to said database;
   providing an inventory tracking means in communication with said database, for supplying event information to said database; said inventory tracking means comprising a camera in communication with said computer, said camera being located to provide images of entry and egress of vehicles at a portal of the facility and to provide images of packages unloaded or loaded into a vehicle parked at the portal of the facility;
   and
   providing an alert means in communication with said database, using said event information; wherein said alert means comprises software operated by said computer to associate event IDs with event activities and images captured at the time of the event; and
   using said computer to process the event information supplied to said database to compile an event library.

8. A method as claimed in claim 7, further comprising the step of using said computer and said event library to generate alerts.

9. A method as claimed in claim 7, further comprising the step of using said computer and said event library to compile reports.

10. A method as claimed in claim 7, further comprising the step of using said computer and said event library to control access to and egress from the facility.

11. A management system for a fire station facility, comprising:
- a computer;
- a database in communication with said computer;
- a task tracking means in communication with said database;
- an access management means in communication with said database, for supplying event information to said database;
- a vehicle detecting means in communication with said database, for supplying event information to said database; and
- an alert means in communication with said database, using said event information; wherein said alert means further comprises software operated by said computer to associate event IDs with event activities and images captured at the time of the event; and
- a camera in communication with said computer, said camera being located to provide images of entry and egress of fire trucks and fire vehicles at a portal of the fire station facility;
- whereby said computer uses the event information supplied to said database to compile an event library which is configured to generate alerts, compile reports, and control access to and egress from the facility.

12. A management system for a facility as claimed in claim 11, further comprising a network providing communication with said database and with said computer.

13. A management system for a facility as claimed in claim 11, wherein said task tracking means includes a truck detector for detecting the presence of a fire truck.

14. A management system for a facility as claimed in claim 13, further comprising an event monitor for recording an event which includes the reading of the employee ID together with the entering of the task information into the ID reader.

15. A management system for a rental car facility, comprising:
- a computer;
- a database in communication with said computer;
- a task tracking means in communication with said database;
- an access management means in communication with said database, for supplying event information to said database;
- a vehicle detecting means in communication with said database, for supplying event information to said database;
- wherein said vehicle detecting means further comprises a camera in communication with said computer, said camera being located to provide images of entry and egress of vehicles at a portal of the rental car facility; and
- an alert means in communication with said database, using said event information; wherein said alert means further comprises software operated by said computer to associate event IDs with event activities and images captured at the time of the event;
- whereby said computer uses the event information supplied to said database to compile an event library which is configured to generate alerts, compile reports, and control access to and egress from the facility.

* * * * *